(12) United States Patent
Naude

(10) Patent No.: US 8,540,596 B2
(45) Date of Patent: Sep. 24, 2013

(54) INCREMENTAL VARIABLE TRANSMISSION

(75) Inventor: Johannes Jacobus Naude, Randburg (ZA)

(73) Assignee: Varibox IP (Pty) Ltd., Randburg (ZA)

(*) Notice: Subject to any disclaimer, the term of this patent is extended or adjusted under 35 U.S.C. 154(b) by 403 days.

(21) Appl. No.: 12/989,459

(22) PCT Filed: Apr. 23, 2009

(86) PCT No.: PCT/ZA2009/000031
§ 371 (c)(1),
(2), (4) Date: Oct. 25, 2010

(87) PCT Pub. No.: WO2009/132364
PCT Pub. Date: Oct. 29, 2009

(65) Prior Publication Data
US 2011/0039645 A1 Feb. 17, 2011

(30) Foreign Application Priority Data

Apr. 25, 2008 (ZA) .................................. 2008/03783
Aug. 6, 2008 (ZA) .................................. 2008/06882

(51) Int. Cl.
*F16H 9/20* (2006.01)
*F16H 9/24* (2006.01)
*F16H 55/54* (2006.01)
*F16H 55/56* (2006.01)
*F16H 61/662* (2006.01)

(52) U.S. Cl.
USPC ............................................................ 474/8

(58) Field of Classification Search
USPC ................................................ 474/8–29, 49–51
See application file for complete search history.

(56) References Cited

U.S. PATENT DOCUMENTS

| 4,770,065 | A   | * | 9/1988  | Woyton | 477/44   |
|-----------|-----|---|---------|--------|----------|
| 4,929,218 | A   | * | 5/1990  | Clough | 474/83   |
| 7,563,185 | B2  | * | 7/2009  | Naude  | 474/49   |
| 7,713,153 | B2  | * | 5/2010  | Naude  | 474/49   |
| 2005/0221926 | A1 | * | 10/2005 | Naude | 474/8    |
| 2006/0252589 | A1 | * | 11/2006 | Tay   | 474/83   |
| 2007/0207884 | A1 | * | 9/2007  | Unno  | 474/18   |
| 2008/0058135 | A1 | * | 3/2008  | Naude | 474/8    |
| 2008/0115623 | A1 | * | 5/2008  | Naude | 74/665 B |
| 2010/0062885 | A1 | * | 3/2010  | Naude | 474/49   |

FOREIGN PATENT DOCUMENTS

| WO | 03056212 A1   | 7/2003 |
|----|---------------|--------|
| WO | 2005036028 A1 | 4/2005 |
| WO | 2007037747 A1 | 4/2007 |
| WO | 2007059539 A1 | 5/2007 |
| WO | 2010040153 A1 | 4/2010 |

OTHER PUBLICATIONS

International Search Report, dated Jan. 19, 2010, from corresponding PCT application.

* cited by examiner

*Primary Examiner* — William E Dondero
*Assistant Examiner* — Mark K Buse
(74) *Attorney, Agent, or Firm* — Young & Thompson

(57) ABSTRACT

An incrementally variable transmission machine with an input drive and an output drive which are linked by a drive chain, and which includes an oscillating cam arrangement which, at each of two limiting positions, can act on an actuating mechanism to vary the speed of the output drive by an increment.

20 Claims, 16 Drawing Sheets

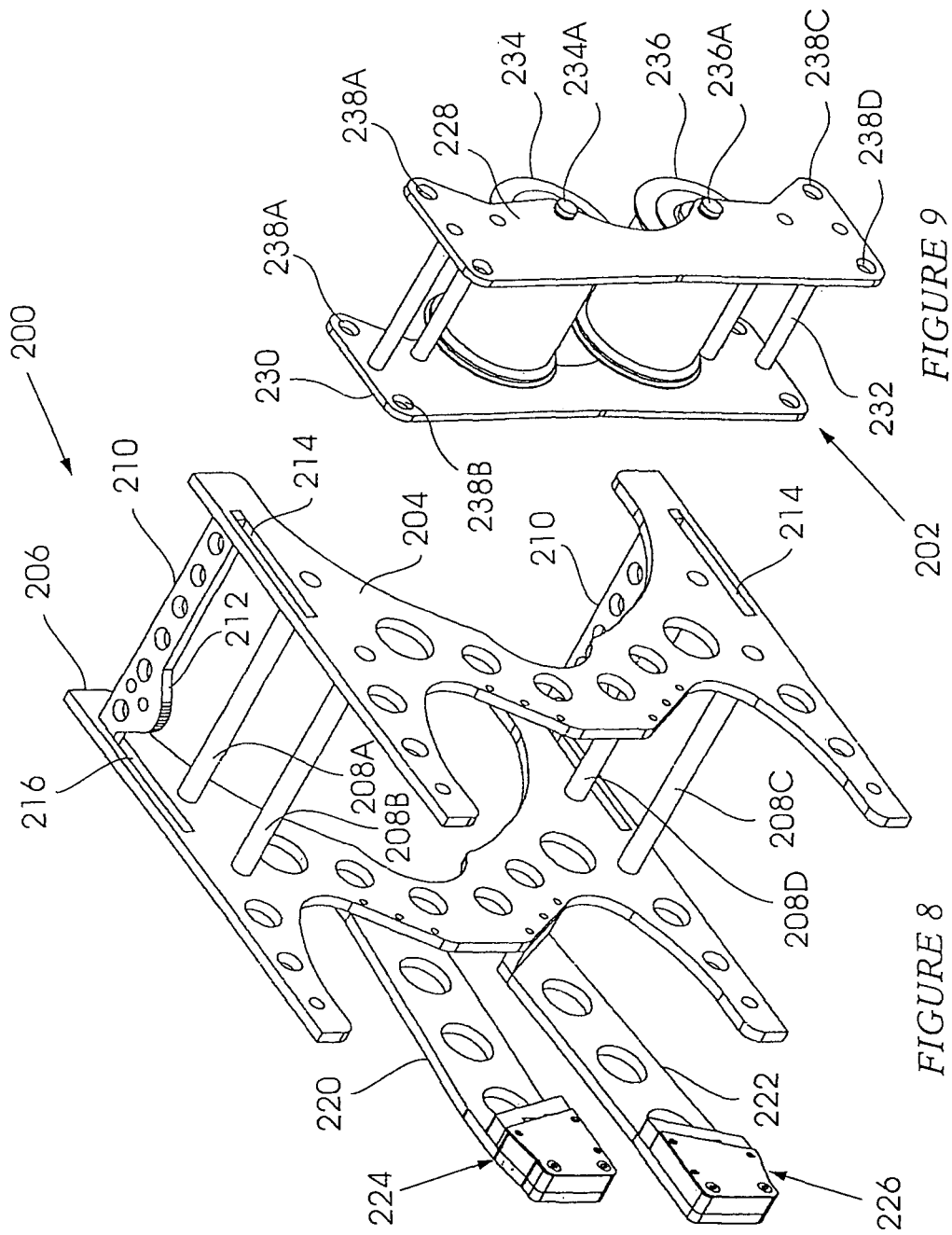

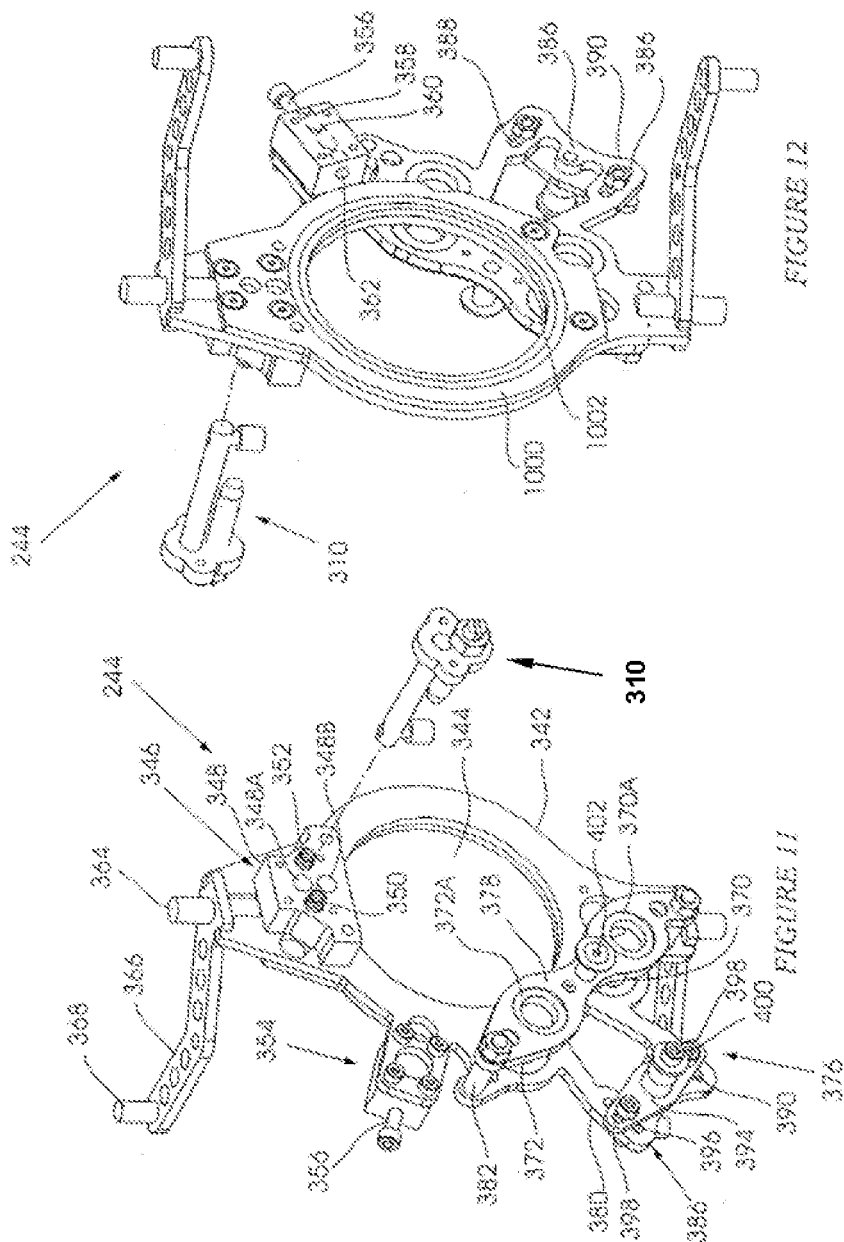

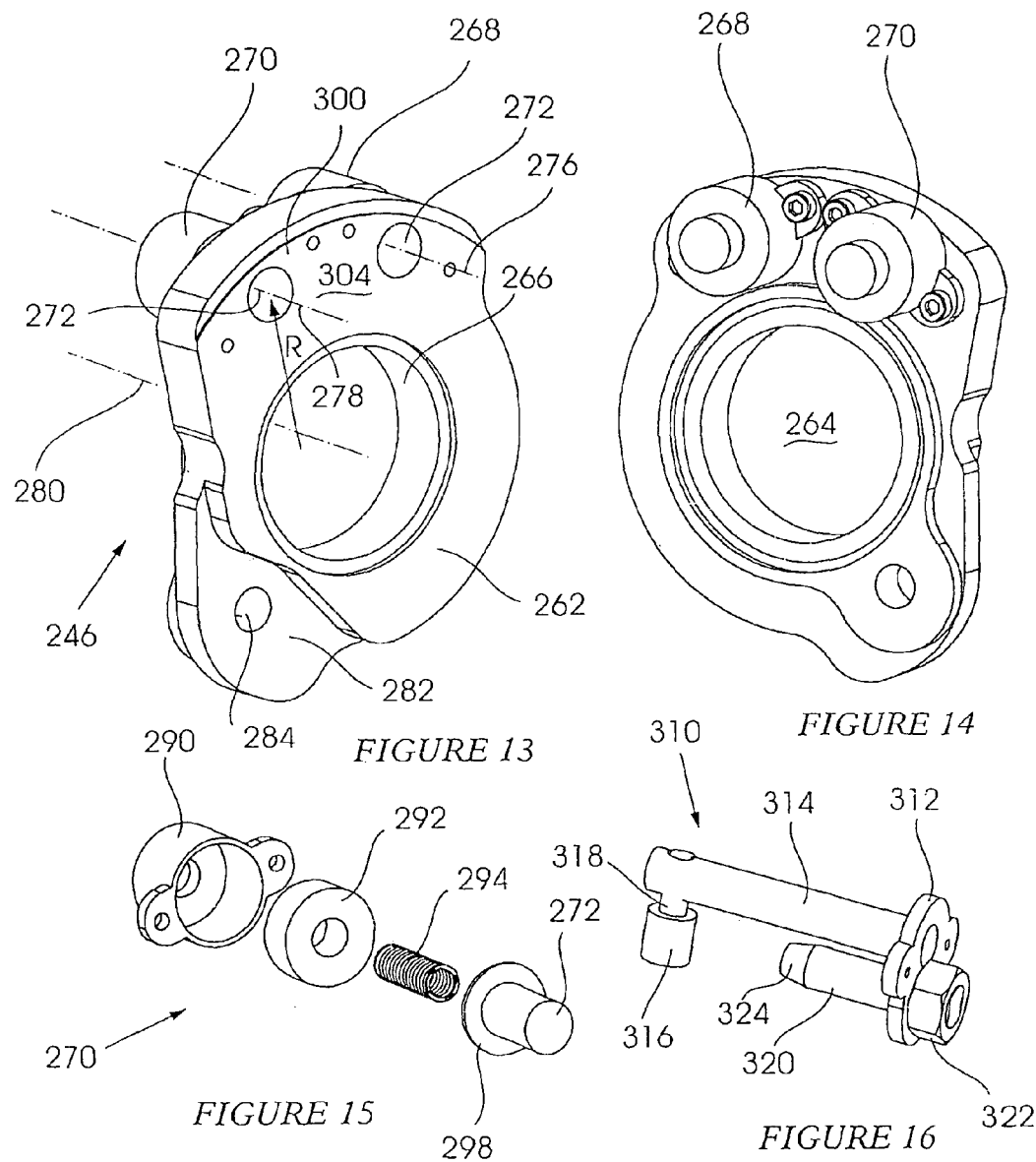

INCREMENTAL VARIABLE TRANSMISSION

BACKGROUND OF THE INVENTION

This invention relates to a variable transmission (IVT) machine in which the ratio of an output rotational speed to an input rotational speed, of the machine, is adjustable in increments.

The specification of International application number PCT/ZA2004/000023 (herein the "earlier specification") describes an infinitely variable transmission in which the ratio of output speed to input speed can be incrementally varied. The machine is, however, of complex construction and is not compact. Another adverse factor is that the tension in a drive chain between input and output drives of the machine can vary in an unsatisfactory manner depending, for example, on whether a prime mover is operating on the machine or if the machine is being used in a braking mode.

The present invention aims to provide a variable transmission machine which is compact and which can transmit substantial power and in which the ratio of output to input speed can be varied in a large number of small increments so that, for practical purposes, the output speed does not change in a step-wise manner. It is also an object of the present invention to provide an integrated chain tensioning system with a simple, robust and integrated mechanical shifting mechanism thereby to avoid the use of hydraulic arrangements. The last mentioned aspect is of particular significance for, by way of example, a hydraulic pump, in an IVT machine which has a hydraulic control system, runs continuously and can consume up to 5% or 6% of the available power.

SUMMARY OF THE INVENTION

The invention provides a variable transmission machine which includes an input drive which is rotatable at a first speed about an input axis, an output drive which is rotatable at a second speed, which is dependent on the first speed, about an output axis, a controller which is operable to vary the second speed without changing the first speed, a cam arrangement which, in response to rotation of the output drive, is oscillated between first and second positions through a reference position, and an actuating mechanism which is selectively operable when the cam arrangement is at the first position or at the second position to cause operation of the controller so as to increase, or decrease, the second speed by an increment.

Depending on operational factors, the actuating mechanism may include a single actuator which is used to cause the second speed to be increased, or decreased, according to requirement. In a different approach though at least first and second actuators are used to cause an increase, or a decrease, in the second speed by an increment.

The first position of the cam arrangement may be a first limiting position which is displaced by a first angle in a first direction of rotation from the reference position. The second position may be a second limiting position which is displaced by the first angle in a second direction of rotation, which is opposite to the first direction, from the reference position. The cam arrangement may provide a first dwell period when the cam arrangement is at the first limiting position and, during the first dwell period, the actuating mechanism may be operable. Similarly, a second dwell period may be provided when the cam arrangement is at the second limiting position and the actuating mechanism may be operable during the second dwell period.

It is possible for the actuating mechanism to be operated mechanically or electrically, in a predetermined manner, or via human intervention. Preferably each actuator in the actuating mechanism includes a respective solenoid and, using techniques which are known in the art and which are not further described in this specification, the actuators are operated by a suitable control unit e.g. a microprocessor or similar device. Although this aspect is important to effective operation of the machine it has no direct bearing on an understanding of the inventive principles embodied in the machine.

The cam arrangement may be used with various machines which have different input drives and different output drives. In a preferred application of the principles of the invention the cam arrangement is used with a machine which is, in general terms, similar to the machine described in the earlier specification. The disclosure in the earlier specification is hereby incorporated into this specification. Thus, in a preferred application, the output drive includes axially aligned, opposing first and second conical discs which are spaced apart and which are rotatable about the output axis, and the controller includes a screw assembly which acts between the first and second discs and which is operable in a first mode, upon operation of the actuating mechanism to increase the spacing between the discs by a first amount and so increase the second speed by an increment, and which is operable in a second mode, upon operation of the actuating mechanism, to decrease the spacing between the discs by a second amount and so decrease the second speed by an increment.

If a single actuator is used then the actuator, which typically is a solenoid, must be capable of exerting sufficient force, within a defined period, to operate effectively.

The aforementioned discs may, generally, be of the type described in the earlier specification. A drive chain may be used to transfer rotational drive from the input drive to the output drive and the drive chain may, in general terms, be similar to what has been described in the earlier specification.

The input drive may include an input shaft which is rotatable about the input axis, an idler which is mounted for rotation about the input axis, a first swing arm which is mounted for limited pivotal movement about the input axis, a first drive sprocket on the first swing arm, a second swing arm which is mounted for limited pivotal movement about the input axis, a second drive sprocket on the second swing arm, the drive chain being engaged with the first and second drive sprockets and passing over the idler, and a gear assembly which, upon rotation of the input shaft, causes rotation of the first and second drive sprockets thereby to cause rotation of the output drive.

The swing arms may extend from the input axis in divergent directions, which vary as the drive ratio (the ratio of the second speed to the first speed) changes. The swing arms, for any given directions i.e. operative positions, may be mounted to have a small degree of pivotal movement. This may be achieved by providing a first stop which restricts pivotal movement of the first swing arm when a first portion of the drive chain between the first sprocket and the output drive is tensioned. Similarly a second stop may be provided which restricts pivotal movement of the second swing arm when a second portion of the drive chain between the second sprocket and the output drive is tensioned. The first stop may include a first biasing mechanism which acts to tension the first portion of the drive chain when the second portion of the drive chain is tensioned and, similarly, the second stop may include a second biasing mechanism which acts to tension the second portion of the drive chain when the first portion of the drive chain is tensioned.

The first and second drive sprockets may be mounted to respective shafts for relative axial movement along the shafts when the spacing between the first and second discs is varied.

The machine preferably includes a mechanism which, in response to incremental changes in the second speed, adjusts the tension in the drive chain by adjusting the positions of the swing arms. Power can flow through the machine in different directions. For example, in a vehicular application, power is transferred from an engine through the machine to drive wheels of the vehicle. If however engine braking takes place e.g. the vehicle goes downhill with reduced engine power output, power flows through the machine in a reverse direction. In order to reduce chain tension on the idler and, effectively, to isolate the idler from chain tension effects when power is output by the output drive a portion of the drive chain between the first drive sprocket and the output drive is tensioned, and when power is input to the output drive a portion of the drive chain between the second drive sprocket and the output drive is tensioned.

The machine may include a support slide structure which is movable laterally relative to the output axis, and first and second guide idlers which are mounted to the support slide structure, which are engaged with the drive chain and which are spaced apart to form a gap through which opposing portions of the drive chain pass to, and from, the output drive respectively and wherein, in response to incremental movement of the cam arrangement, the support slide structure and the first and second guide idlers move and cause incremental pivotal movement of the first and second swing arms.

Preferably the first stop is movable, in response to movement of the first swing arm and the action of the first biasing mechanism from a first stop position through a first gap with a maximum width of 2L, and the second stop is movable, in response to movement of the second swing arm and the action of the second biasing mechanism from a second stop position through a second gap with a maximum width of 2L and wherein the sum of the first gap and the sum of the second gap is 2L.

A preload tension in the drive chain is preferably determined by the two biasing mechanisms.

BRIEF DESCRIPTION OF THE DRAWINGS

The invention is further described by way of example with reference to the accompanying drawings in which:

FIGS. 11 and 12 show an oscillating driver unit in perspective from opposing sides, respectively, FIGS. 13 and 14 are views of a locking plate included in the cam arrangement, FIG. 15 is an exploded view of a solenoid actuator used in the machine, FIG. 16 is a perspective view of a locking unit.

DESCRIPTION OF PREFERRED EMBODIMENT

Figure 1A:
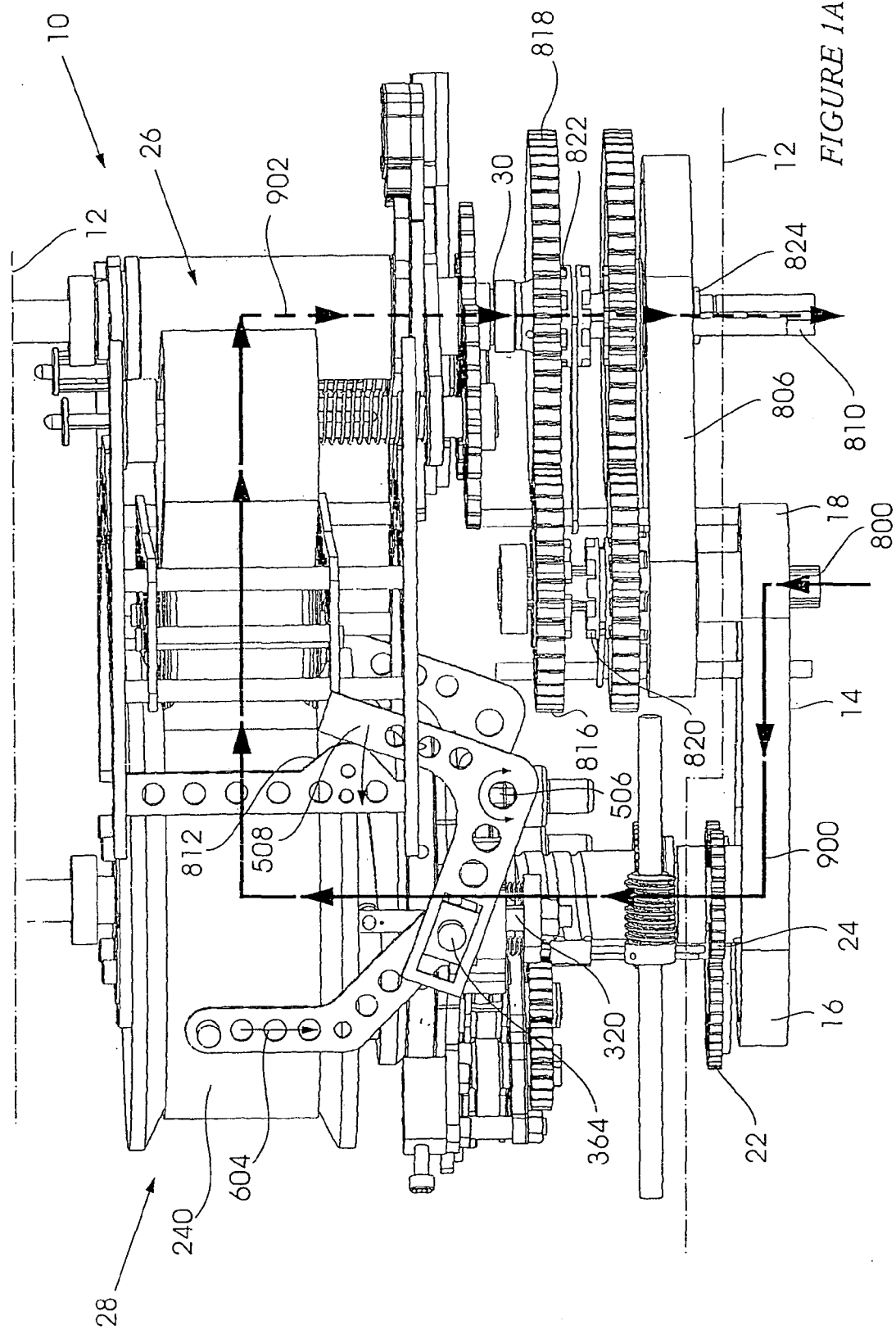
FIGS. 1A and 1B are plan views of a variable transmission (IVT) machine according to the invention, and depict different drive transmission paths through the machine.

The accompanying drawings illustrate different aspects and parts of a machine 10 according to the invention. The components of the machine are mounted in any appropriate housing 12 (shown notionally, when required, by a dotted line) in which are formed various slots and support structures, as may readily be determined by a person skilled in the art, to support components, moving or stationary, of the machine.

Referring for example to FIGS. 1A, 1B, 2 and 3 a chain 14, located externally of the housing, passes over cogs 16 and 18 respectively. Meshing gears 22 and 24 are on an outer side of the housing. Within the housing the machine has an input drive 26 and an output drive 28.

Figure 4:
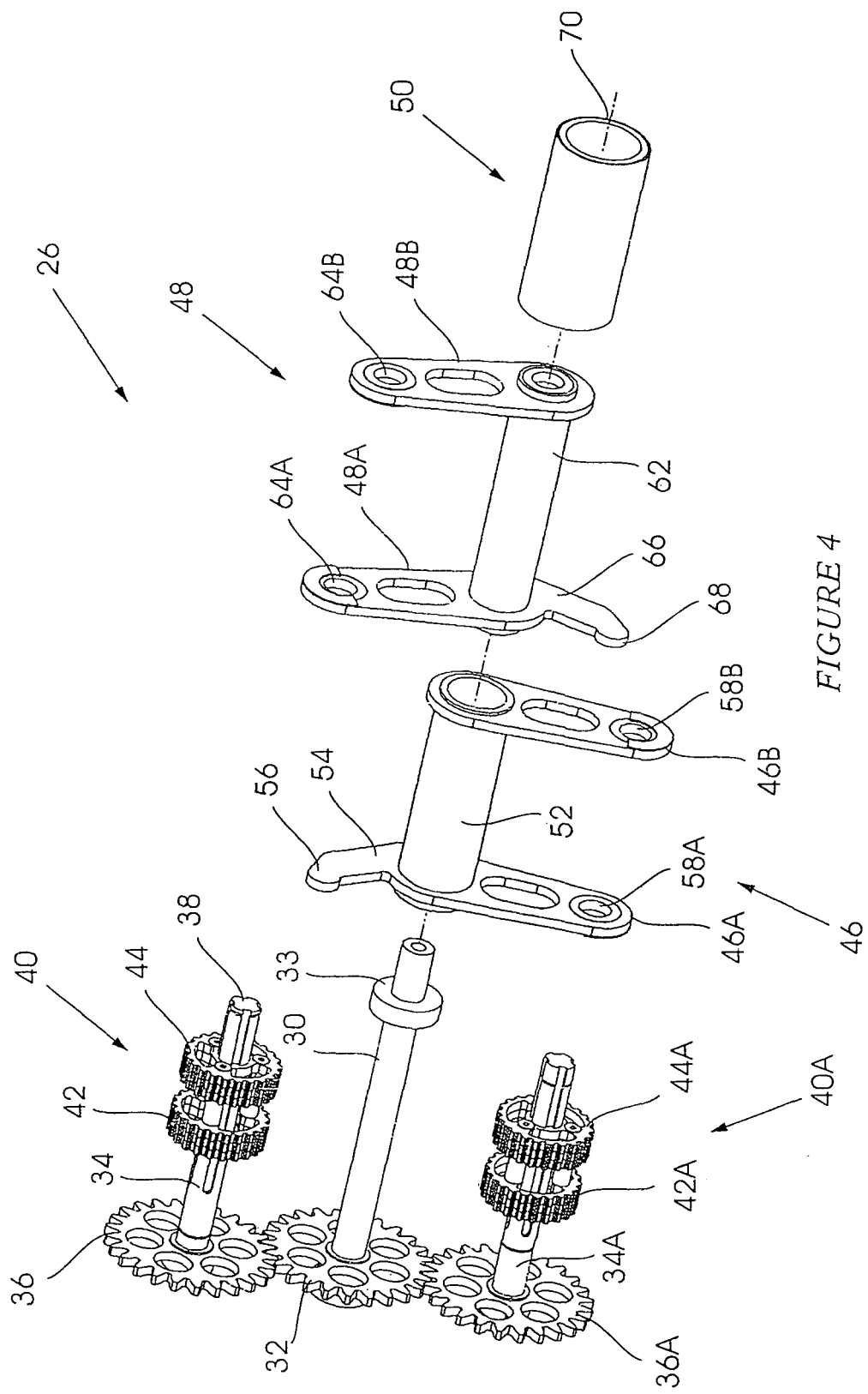
FIG. 4 is an exploded view of part of an input drive unit of the machine.

FIG. 4 shows, in an exploded configuration, the input drive 26 which includes an input shaft 30 with an input sprocket 32 at one end and a bearing 33 at an opposed end. A shaft 34 is positioned to one side of the input shaft and has a sprocket 36 fixed to it which meshes with the input sprocket 32. The shaft 34 is formed with splines 38. An axially slidable chain drive 40, which includes two spaced apart sprockets 42 and 44 respectively, is mounted to the shaft 34.

A drive shaft 34A is positioned on an opposing side of the input shaft. The shaft is similar in construction to the shaft 34 and carries a chain drive 40A with similar components to the chain drive 40, which are identified with the suffix A.

The input drive includes a lower swing arm 46, an upper swing arm 48 and a tubular idler 50.

The lower swing arm 46 has spaced arms 46A and 46B respectively which extend from a tube 52. A projection on the arm 46A forms a cam lever 54 with a cam lobe 56. The arms 46A and 46B have bearings 58A and 58B respectively mounted to them.

The upper swing arm 48 is of similar construction to the lower swing arm and includes a tube 62 from which extend spaced arms 48A and 48B respectively. Each arm has a corresponding bearing 64A and 64B.

The arm 48A is extended to form a cam lever 66 with a cam lobe 68.

The idler 50 is fitted with inner needle bearings 70.

When the input drive is assembled the shaft 30 extends through the tube 62 which is inside the tube 52. The idler 50 is on an outer side of the tube 52.

The chain drive 40 is between the arms 48A and 48B. The shaft 34 is supported by the bearings 64A and 64B. The chain drive 40A is between the arms 46A and 46B and the shaft 34A is supported by the bearings 58A and 58B.

The sprockets 32, 36 and 36A are identical in that they have the same diameter and the same number of teeth. A chain 240

(see for example FIG. 1A) which transfers drive between the input drive 26 and the output drive 28, has the same pitch circle PC (see FIG. 22) as it passes over the sprockets 42 and 44, and 42A and 44A, and the idler 50.

Additional bearings, either not shown or not described, are provided as necessary between relatively rotatable parts of the input drive.

The output drive 28 (see primarily FIGS. 5, 6 and 7) has an outer disc 80 with a conical face 82 in which are formed a plurality of precisely positioned grooves 84. The outer disc faces an inner disc 86 which has a generally similar construction i.e. a substantially conical face 88 in which are formed a plurality of precisely positioned grooves 90. An output drive shaft 92 is fixed to the outer disc 80. A tubular boss 94 extends from the disc 80 and surrounds a part of the shaft 92. Two diametrically opposed grooves 96 extend axially in an outer surface of the boss 94—(only one groove is visible in FIG. 6). A tubular formation 100 extends from the disc 80 and surrounds and is spaced from an outer surface of the boss 94.

The inner disc 86 has a tube 102 which fits closely inside an annular gap 104 between opposing surfaces of the boss 94 and the tubular formation 100. An inner surface of the tube 102 is formed with diametrically opposed grooves 108, see FIG. 7. Ball-bearings, not shown, are located in the grooves 96 and 108 so that one disc can be moved axially relative to the other disc but without allowing rotation of one disc relative to the other.

The cog 16 and the gear 24 (FIG. 1A) are fixed to an end of the shaft 92.

The inner disc 86, on an outer face 114, has a raised boss 118 which carries a thrust bearing 120 and a needle bearing 122. The boss 118, on a surface which opposes the outer face 114, is formed with an axially oriented cam lobe 126 which has up and down ramps 126A, 126B of equal magnitude. Each ramp extends through an angle of about 60°. The sum of the angles through which the ramps are operative is thus about 120°. This is reflected in the curve 590 in FIG. 24 (described hereinafter) which graphically depicts the movement of a cam follower 316 (FIG. 16) which rides on the cam lobe.

On its outer side 130 (FIG. 7) the outer disc has a bearing 132 which supports the shaft 92.

A ball screw arrangement 136 includes a tube 138 with an external spiral groove 140. On an inner side the tube 138 has needle bearings 142 which are rotatably engaged with the shaft 92. A worm gear wheel 144 at one end of the tube is backed by a thrust bearing 146 and a bearing 148 which is supported by the housing 12.

A ball screw unit 150 includes an inner hub 152 (FIG. 7) which, on an inner surface, has a female ball screw thread 154 which includes a feedback path for ball-bearings, not shown, which are mated with the spiral groove 140 on the tube 138. The inner hub extends from a generally circular body 160 with a rim 162 in which are formed a plurality of hemispherical indentations 164 at angular spacings of 45°.

Figure 6:
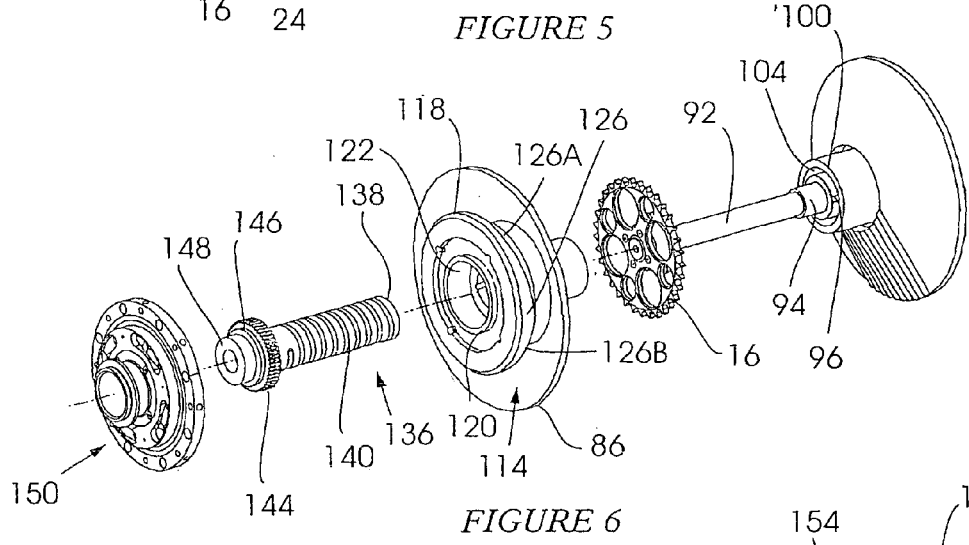
Figures 6A, 6B:
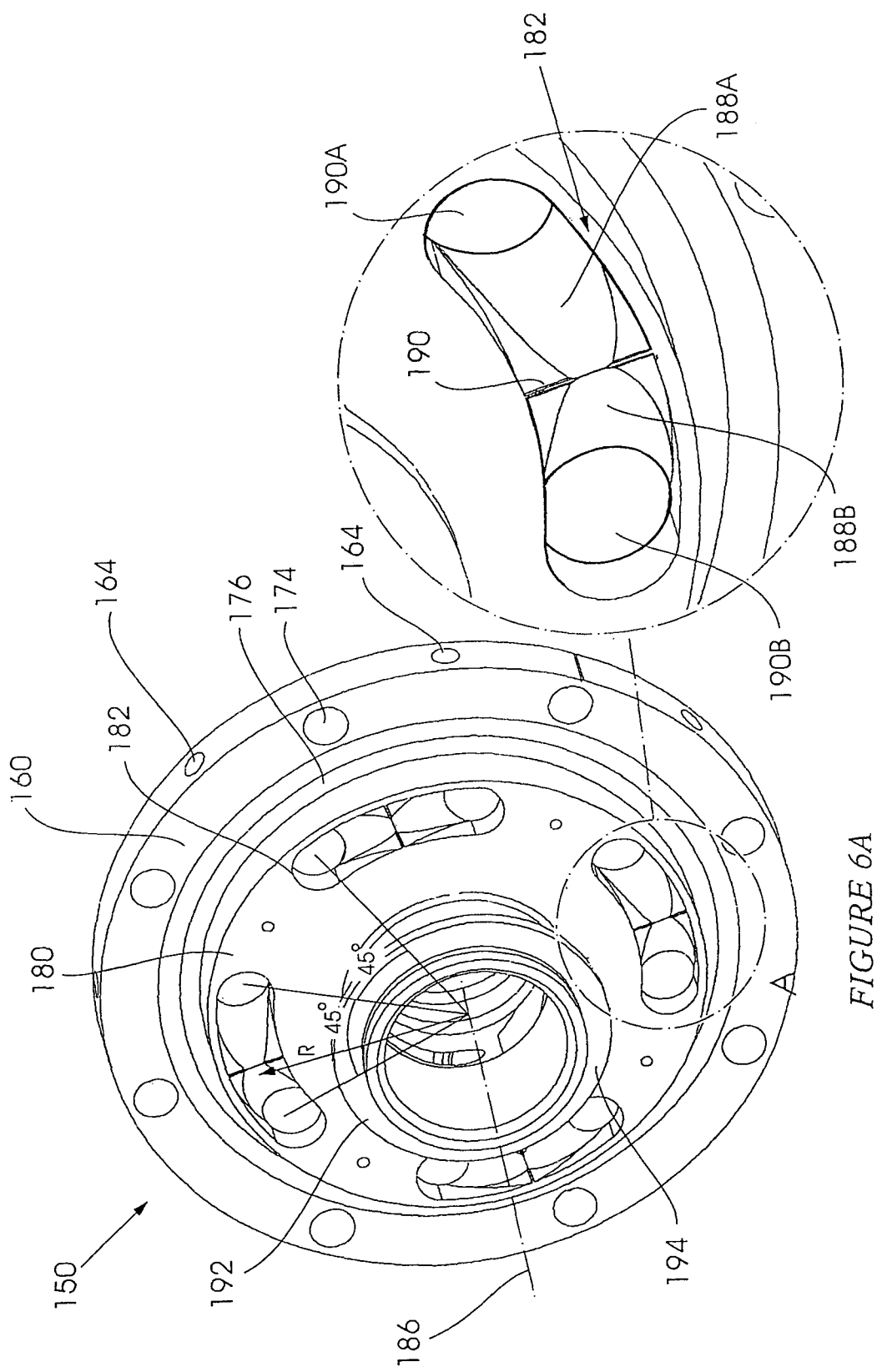
FIG. 6A is an enlarged view of a body on one of the output drive discs.
FIG. 6B shows further detail of the body of FIG. 6A.

FIG. 6A is an enlarged view of the body 160 and illustrates in better detail constructional aspects of the body. FIG. 6B shows, on a greater scale additional aspects of a portion of the body 160. The body 160 has inwardly tapered lock holes 174 which are angularly spaced from one another by 45°. Each lock hole is centrally positioned between a respective adjacent pair of indentations 164. A circular ball-bearing thrust groove 176 is located inwardly of the lock holes 174.

A circular raised portion 180 on the body is formed with four arcuate slots 182. Each slot extends through an angular displacement of 45° (as indicated) and follows a radius R relative to a central longitudinal axis 186 of the output drive shaft 92. Adjacent slots are angularly separated by 45° (as indicated). Each slot has two ramps 188A and 188B which slope downwardly and outwardly from a central position 190 which is coplanar with an outer surface of the raised portion 180, towards respective deep ends 190A and 190B, defined by respective blind holes.

A central tubular formation 192, on the body 160, supports a washer 194 which is held in position by means of a circlip, not shown.

An inner side of the body 160 abuts the thrust bearing 120 and an outer surface of the inner hub 152 is engaged with an inner surface of the bearing 122.

Figure 5:
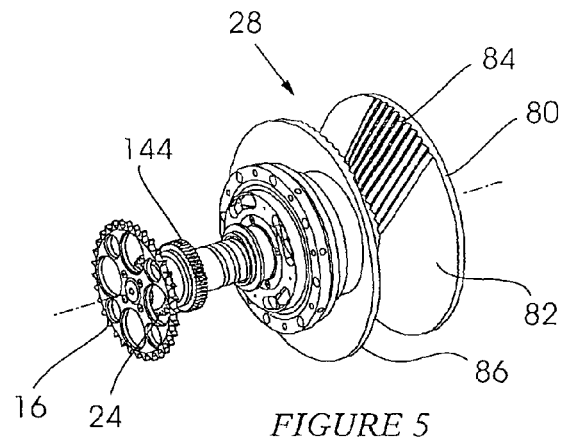
FIGS. 5 and 6 show output drive discs of the machine in an assembled, and exploded, configuration, respectively.

FIG. 5 shows the assembled output drive 28. The effect of the ball screw arrangement 136 is such that, if rotation of the tube 138 is constrained, rotation of the body 160 in one direction will cause the inner disc 86 to be moved axially towards the outer disc 80. Conversely, counter-rotation of the body 160 causes the axial displacement between the discs 80 and 86 to be increased.

FIG. 8 shows an outer support slide 200 while FIG. 9 shows an inner support slide 202. The support slide 200 has spaced plates 204 and 206 respectively braced by rods 208A to 208D. A small plate 210 with a cam surface 212 extends between the plates and is flanked by opposing slots 214 and 216 in the plates 204.

Extension pieces 220 and 222 on the plate 206 carry stops 224 and 226 respectively at their extremities. The function and construction of the stops are described hereinafter.

The inner support slide 202 has two plates 228 and 230 which are spaced apart by supporting rods 232. Two closely spaced guide idlers 234 and 236 are rotatably supported between the plates on suitable shafts 234A and 236A respectively.

In the assembled machine the inner support slide 202 is positioned between the plates 204 and 206 of the outer support slide. The rods 208A to 208D are passed through registering pairs of holes 238A to 238D, respectively. The resulting composite slide assembly 239 is located between the input drive 26 and the output drive 28 (see FIG. 2) and is supported by the housing 12 of the machine so that it can move, as required, during operation of the machine with a sliding action away from the input drive and towards the output drive, and vice versa.

Figure 2:
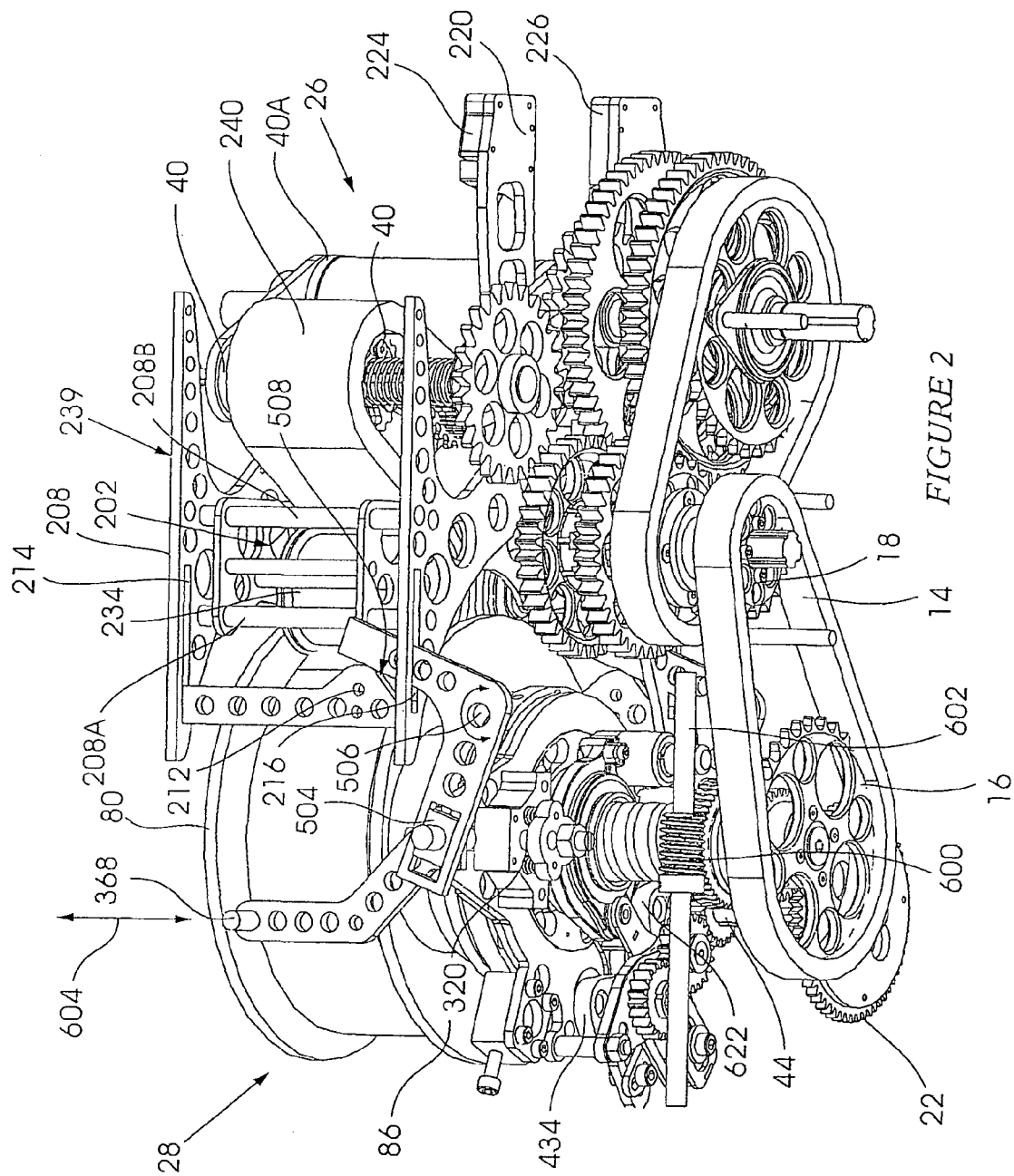
FIG. 2 is a perspective view of the machine.
Figure 22:
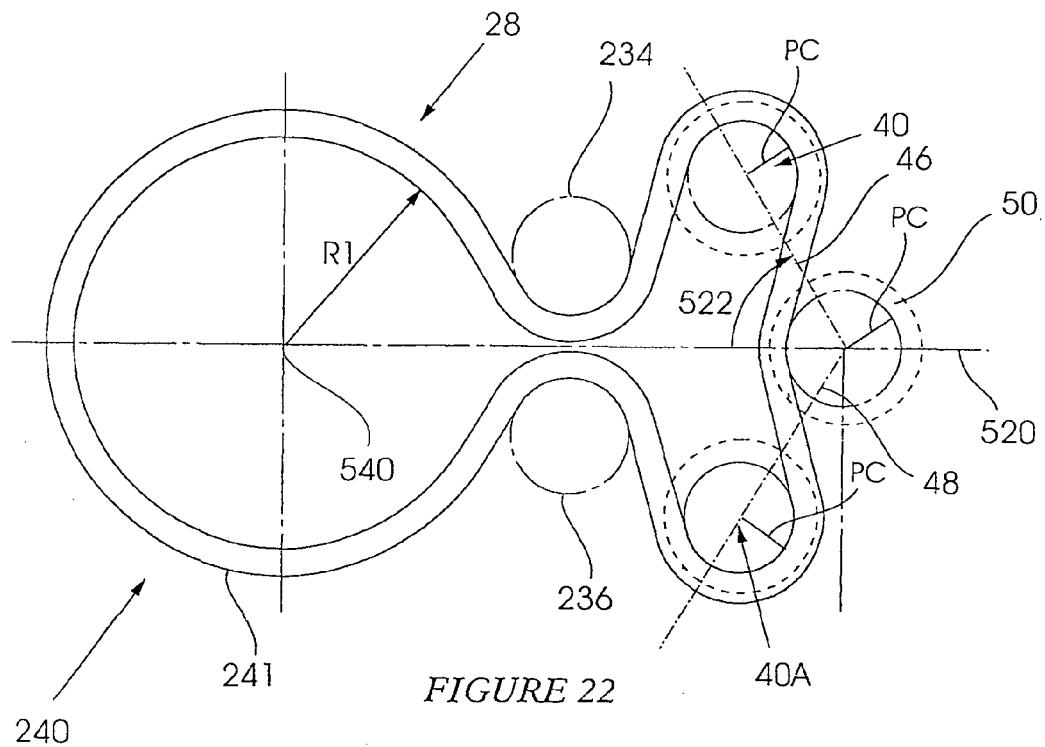
FIGS. 22 and 23 illustrate paths traveled by a drive chain in the machine while in a low ratio, and high ratio, mode respectively, and FIG. 24 graphically shows parameters of the machine which vary during operation.
Figure 23:
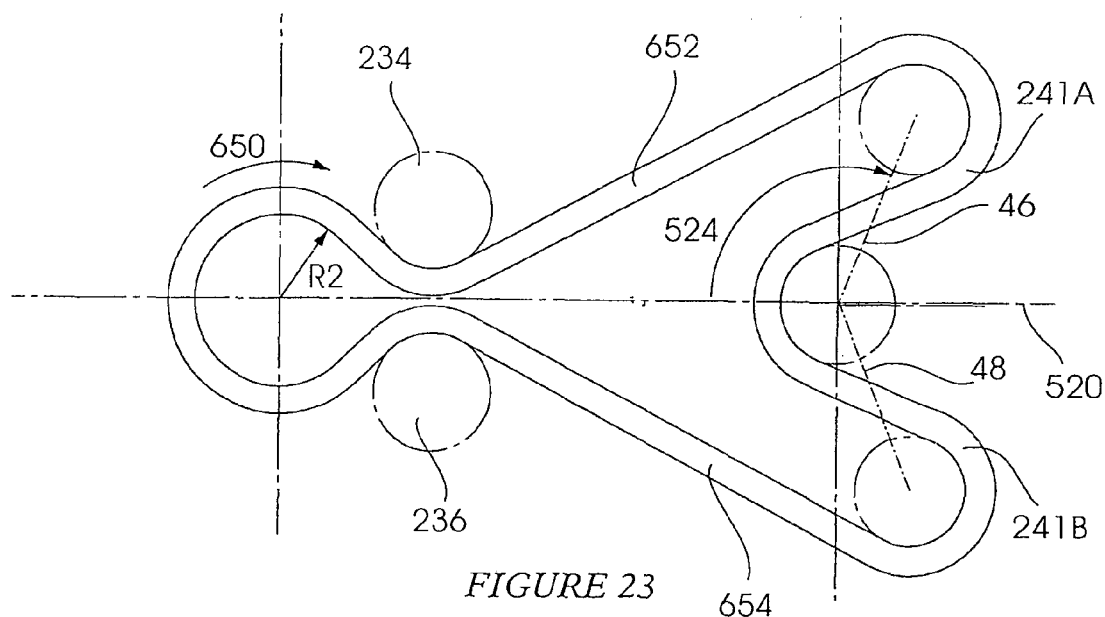

Referring to FIG. 2, and to the schematic depictions in FIGS. 22 and 23, a chain 240 (shown notionally) passes through gaps between the chain drive 40 and the idler 50 on the one hand, and the idler 50 and the chain drive 40A on the other hand. Opposing portions of the chain pass through a gap between the guide idlers 234 and 236. The remainder of the chain forms a loop 241 between opposing surfaces of the outer disc 80 and the inner disc 86. The chain is engaged with the sprockets 42 and 44, and 42A and 44A, and is used to transfer rotational drive between the input drive 26 and the output drive 28. The chain has a plurality of pins which connect links of the chain to each other and ends of the pins, which project outwardly beyond the links, are engaged with the grooves 84 and 90 in opposing surfaces of the two discs. This direct mechanical interengagement of complementary formations ensures that positive drive (as opposed to frictional drive) is transferred from the input drive to the output drive. The construction of the chain and the way in which drive is transferred from the input drive 26 to the output drive 28 are generally in accordance with the description in the earlier specification and these aspects are not further elaborated on herein.

As stated earlier the pitch circle (PC) of the chain does not vary as it passes around the sprockets 42 and 44, and 42A and 44A, and the idler 50. Thus tensile forces exerted by the chain lengths 241A and 241B (FIG. 23) extending from the idler are minimal. The idler is thus effectively isolated from these forces.

Figure 10:
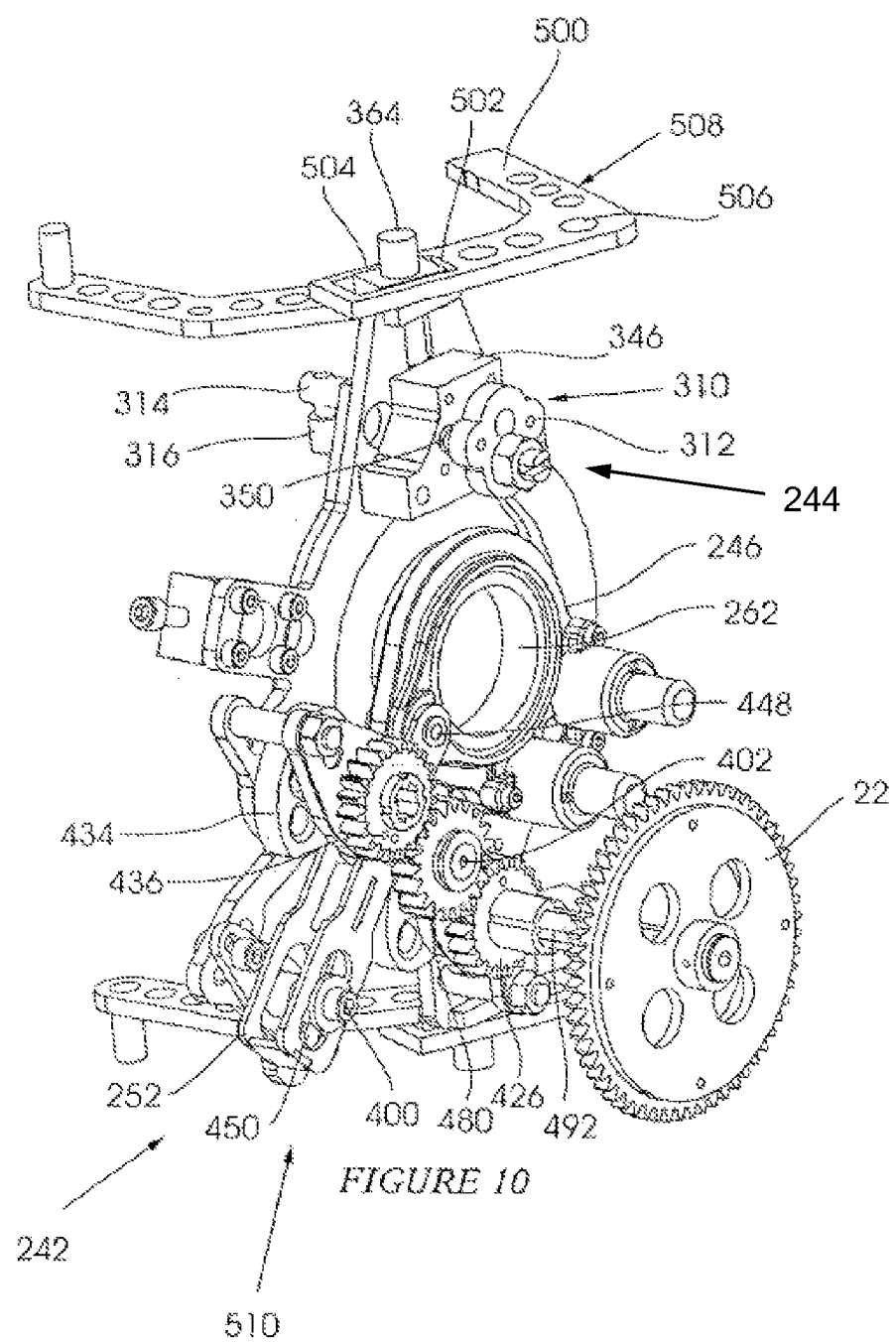
FIG. 10 is a perspective view of a cam arrangement used in the machine.
Figure 17:
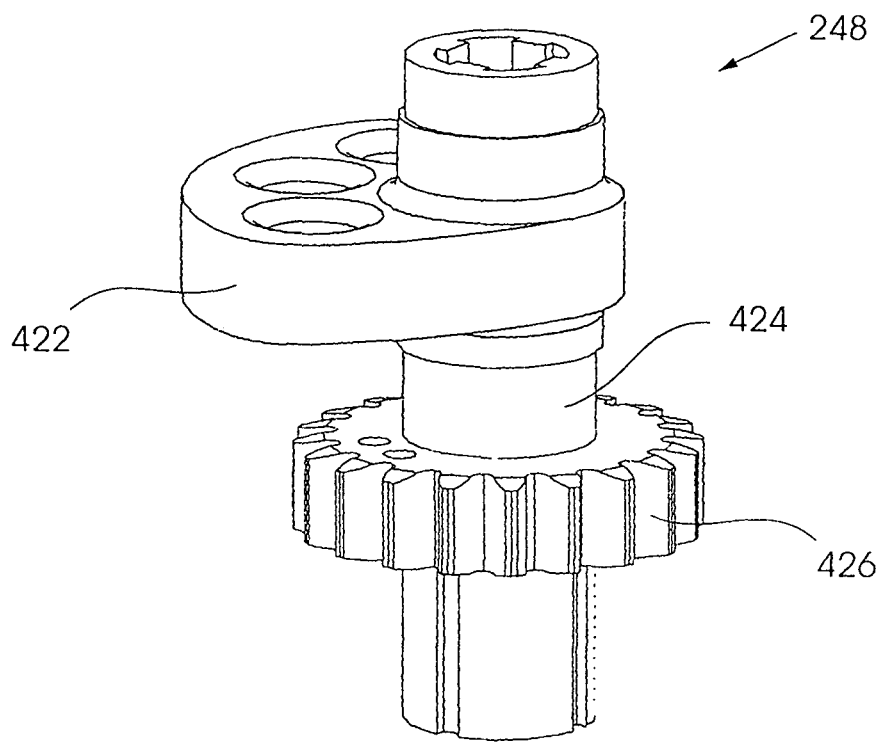
FIGS. 17 and 18 are perspective views of first and second cams respectively, used in the cam arrangement.
Figure 18:
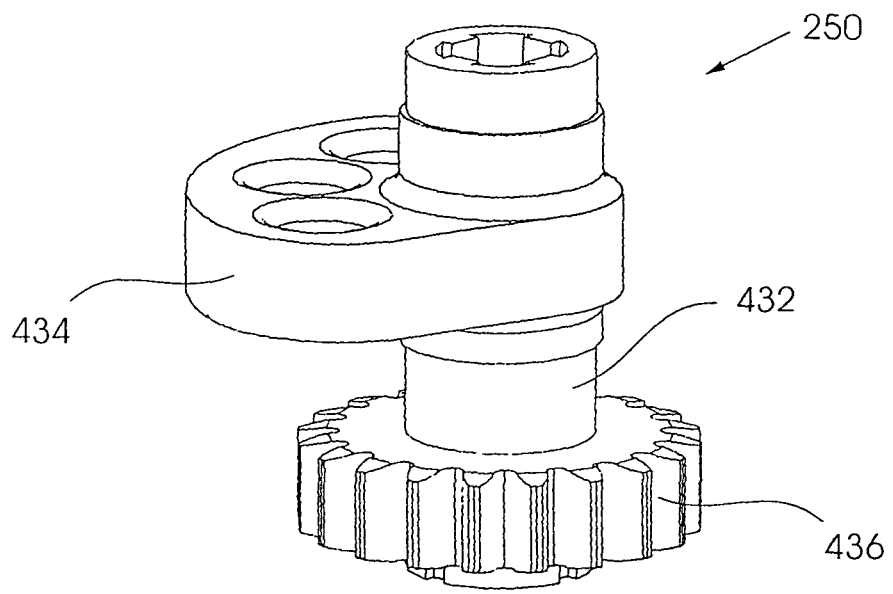
Figure 19:
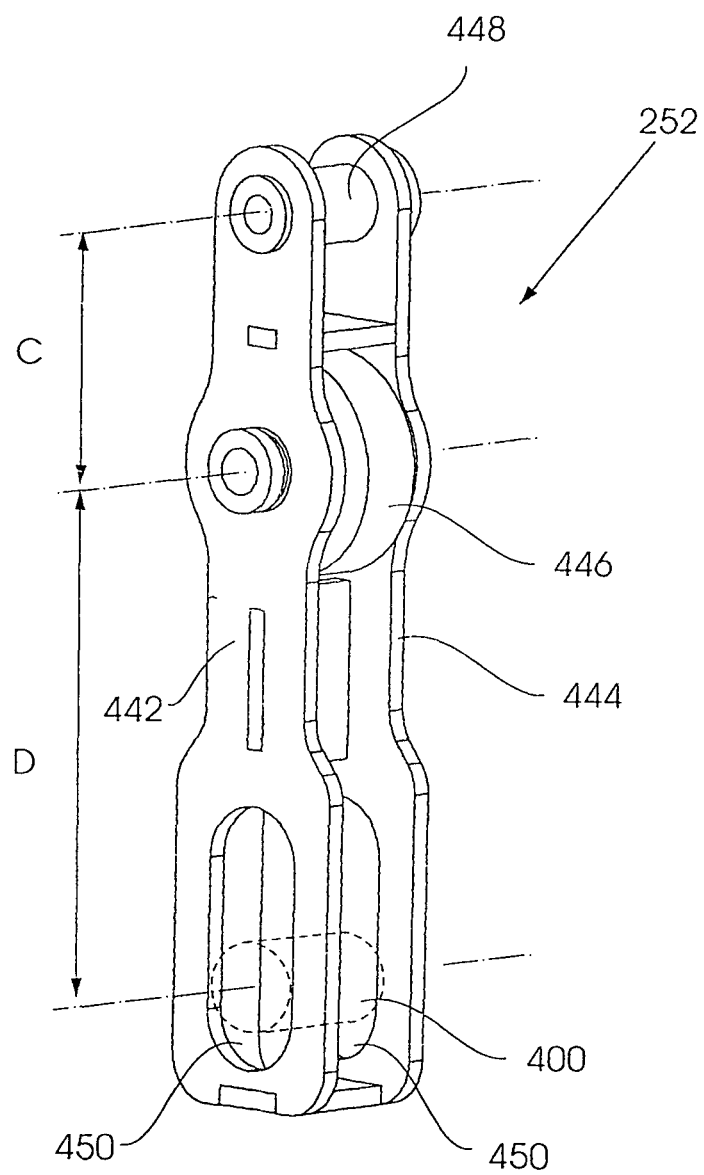
FIG. 19 shows an actuating lever included in the cam arrangement.

FIG. 10 shows a composite cam arrangement 242 which includes an oscillating drive unit 244, shown in different perspective views in FIGS. 11 and 12, a locking plate 246 which is shown in different perspective views in FIGS. 13 and 14, first and second cams 248 and 250 shown in FIGS. 17 and 18 respectively, and an actuating lever 252 shown in FIG. 19.

The locking plate 246 has a body 262 with a central bore 264 in which is located a needle bearing 266. Two solenoids 268 and 270 respectively are mounted to a face of the body. The solenoids have respective plungers 272 positioned on central longitudinal axes 276 and 278 which are angularly spaced apart by 45° determined with reference to a longitudinal axis 280 of the bore. Each axis 276, 278 is a radial distance R away from the axis 280. This distance equals the radius R shown in FIG. 6A.

The body 262 has a lobe 282 in which is formed a hole 284.

Figure 7:
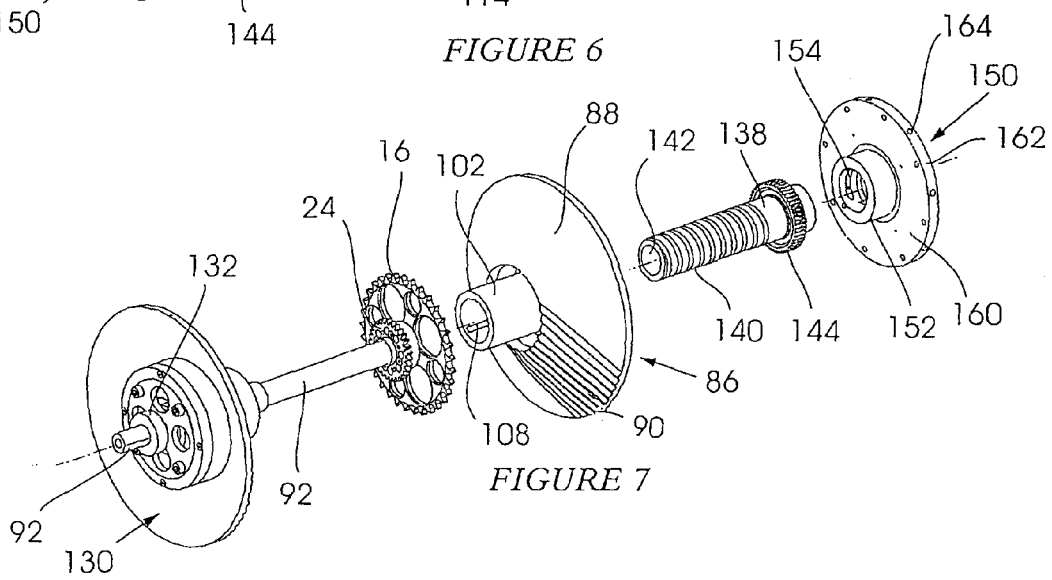
FIG. 7 is similar to FIG. 6 but shows the output drive discs from an opposing side to what is shown in FIG. 6, FIGS. 8 and 9 show an outer, and an inner, support slide, respectively.

The needle bearing 266, in the assembled form of the machine, is rotatably engaged with the tubular formation 192 on an outer face of the body 160 shown in FIG. 6.

FIG. 15 shows the construction of the solenoid 270—the solenoid 268 is of identical construction. The solenoid has a housing 290 in which is located an annular electric coil 292. A spring 294 which extends through the coil acts on the plunger 272 which is of tubular form and which is flanked by a circular rim 298 against which the coil 292 bears. An outer end of the plunger is located in a plunger hole 300 in the body 262.

The functioning of each solenoid is such that, with power applied to the respective coil 292, the plunger is held in the casing 290. If the power supply is interrupted the plunger is forced outwardly, away from the casing by virtue of the biasing force of the spring 294 and an outer extremity of the plunger then protrudes beyond a surface 304 of the body 262.

FIG. 16 illustrates a locking unit 310 which includes a plate 312 from which extends a shaft 314. A cam follower 316 is attached to a stud 318 which projects transversely from an end of the shaft 314. A locking stud 320 is attached to the plate 312 by means of a nut 322. The stud has a tapered end 324.

The oscillating drive unit 244 (FIGS. 11 and 12) includes a plate 342 with a circular hole 344. A lock structure 346, attached to the plate, has a block 348 with upper and lower holes 348A and 348B, and two spaced passages in which are located compression springs 350 and 352 respectively. The oscillating drive unit 244 also includes a bearing plate 1000 with a thrust ball bearing groove 1002, concentric with the hole 344, in which ball bearings (not shown) operate to mate and bear against the ball bearing thrust groove 176 in the body 160.

A locator block 354 projects radially from the plate 342. A bolt 356 is threadedly engaged with a passage 358 (shown in dotted lines in FIG. 12) which extends through the block. An inner end of the bolt bears against a spring 360 which in turn acts on a ball bearing 362 which protrudes slightly through a mouth of the passage which, in the assembled configuration of the machine, is close to the rim 162 of the body 160 (FIG. 7) so that the spring loaded ball-bearing 362 can engage with a respective hemi-spherical indentation 164. This ensures that the ball screw unit 150 is held in place, relative to the cam arrangement 242, according to operational factors at intervals which are angularly spaced by 45°. The engagement configuration is maintained until sufficient torque is applied to the body 160 to enable the compressive force of the spring 360, which acts on the ball bearing 362, to be overcome. Relative rotational movement between the locator block 354 and the body 160 can then take place, until the ball bearing enters the following hemi-spherical indentation.

A stud 364 projects from the plate 342 and an angled lever 366, fixed to the plate, extends from the stud. A remote end of the lever has a stud 368 which is slidably located in a first slot (not shown) in the housing 12. The stud 364 slides in a second slot (not shown) which is in the housing and which is parallel to the first slot.

Bearing pairs 370 and 370A, and 372 and 372A, respectively are provided on spaced plates 378 and 380 which are interconnected by means of studs 382. The plate 378 has a projection 386 with parallel slots 388. A base plate 394 straddles the slots and is connected thereto by means of fasteners 396 which pass through slots 398 in the base plate which are transverse to the slots 388. A swivel stud 400 projects laterally from the base plate. Another stud 402 is centrally positioned on the plate 380 between the bearings 370A and 372A.

The first cam 248 (FIG. 17) includes a cam profile 422 projecting from a splined hollow shaft 424. A spur gear 426 is carried by the shaft. The second cam 250 (FIG. 18) has a splined hollow shaft 432 which carries a second cam profile 434 and a spur gear 436.

The actuating lever 252 (FIG. 19) is formed from two spaced plates 442 and 444 respectively. A cam follower 446 is rotatably mounted between the plates at an intermediate position. A pin 448 is mounted between the plates, on a front side of the cam follower, a distance C from a central axis of the cam follower. Slots 450 are formed in opposing surfaces of the plates on a second side of the cam follower.

The cam follower 446 is located between the cam profiles 422 and 434 which act as a conjugate cam pair.

FIG. 10 illustrates how the oscillating drive unit 244, the locking plate 246, the first and second cams, and the actuating lever, are assembled to make up the composite cam arrangement 242. The swivel stud 400 passes through the slots 450. A central axis of the stud is a distance D from the rotational axis of the cam follower 446 (FIG. 19). The pin 448 is engaged with the hole 284 in the locking plate 246. The first and second cams are respectively mounted to the opposed bearing pairs 370 and 370A, and 372 and 372A. The bore 264 of the body 262 is in register with the hole 344. The locking unit 310 is engaged with the lock structure 346. The shaft 314 extends through the upper hole 348A while the stud 320 extends into the lower hole 348B. The springs 350 and 352 abut an opposing surface of the plate 312.

The spur gears 436 and 426 of the two cams are meshed with an intervening gear 480 which is mounted to the stud 402. The gear 22 (FIG. 2), attached to a splined shaft 492 which extends through and drives the splined shaft 424 of the first cam, has a diameter which is twice the diameter of the spur gear 24.

An angled lever 500 has a rectangular slot 502 which is slidably engaged with a block 504 which is rotatably mounted to the stud 364. A pin (not shown), fixed to the housing 12, is rotatably engaged with the lever by locating the pin in a hole 506. A limb 508 of the lever extends through the slot 216 in the plate 206 of the outer support slide and bears on the cam surface 212—see FIG. 2. A similar construction is provided at an opposing limb 510 of the cam arrangement 242.

When rotational drive is imparted to the input shaft 30 the chain drives 40 and 40A are rotated in opposite directions due to the meshing sprockets 32, 36 and 36A. The chain 240, engaged with the chain drives, is moved along a looped path of the type shown in FIGS. 22 and 23 and the discs 80 and 86, which are physically connected to the chain, due to the interengagement of pins in the chain with respective grooves 84 and 90 in the discs, are rotated about the output drive shaft 92.

If the discs 80 and 86 are moved towards each other then the chain 240, when passing around the discs, travels on a substantially circular loop 241 of a relatively large radius R1, see FIG. 22. The swing arms 46 and 48 are pivoted towards the discs and the chain drives 40 and 40A of the input drive are moved towards the discs. The composite slide assembly 239 is moved to the right towards the idler 50, to allow for the relatively large radius R1 of the loop 241. If the discs are moved apart the radius R2 of the chain looped around the discs is reduced, see FIG. 23. The swing arms are pivoted away from the discs, to take up the resulting slack in the chain. The composite slide assembly moves to the left to maintain the loop 241 as close as possible to a circle. The angle of each swing arm to a line 520 which passes through the centres of rotation of the discs and of the idler 50 changes from a minimum angle 522, see FIG. 22, to a maximum angle 524, see FIG. 23. A significant benefit of this process is that the movement of the swing arms is such as to maintain the chain 240, essentially tensioned to the requisite degree, as operating conditions change.

The present invention is also concerned with providing a smooth and reliable change in the ratio of the output speed to the input speed of the machine, on an incremental basis, in an effective manner. Upon rotation of the output drive in one direction the gear 22, meshed with the gear 24, drives the cam arrangement in a 2:1 ratio in the opposite direction. The spur gear 426 is rotated together with the gear 22 and, via the idler gear 480, the spur gear 436 is rotated. The cam follower 446 is acted on by the first and second cam profiles 422 and 434 and the lever 252 is thereby oscillated about the stud 400. The pin 448 is connected to the locking plate 246 which is oscillated through an amplitude of 45° about the axis 280. The position of the locking plate 246 is graphically depicted by a curve 566 in FIG. 24. The rotational velocity of the plate is shown by a curve 526.

Figure 3:
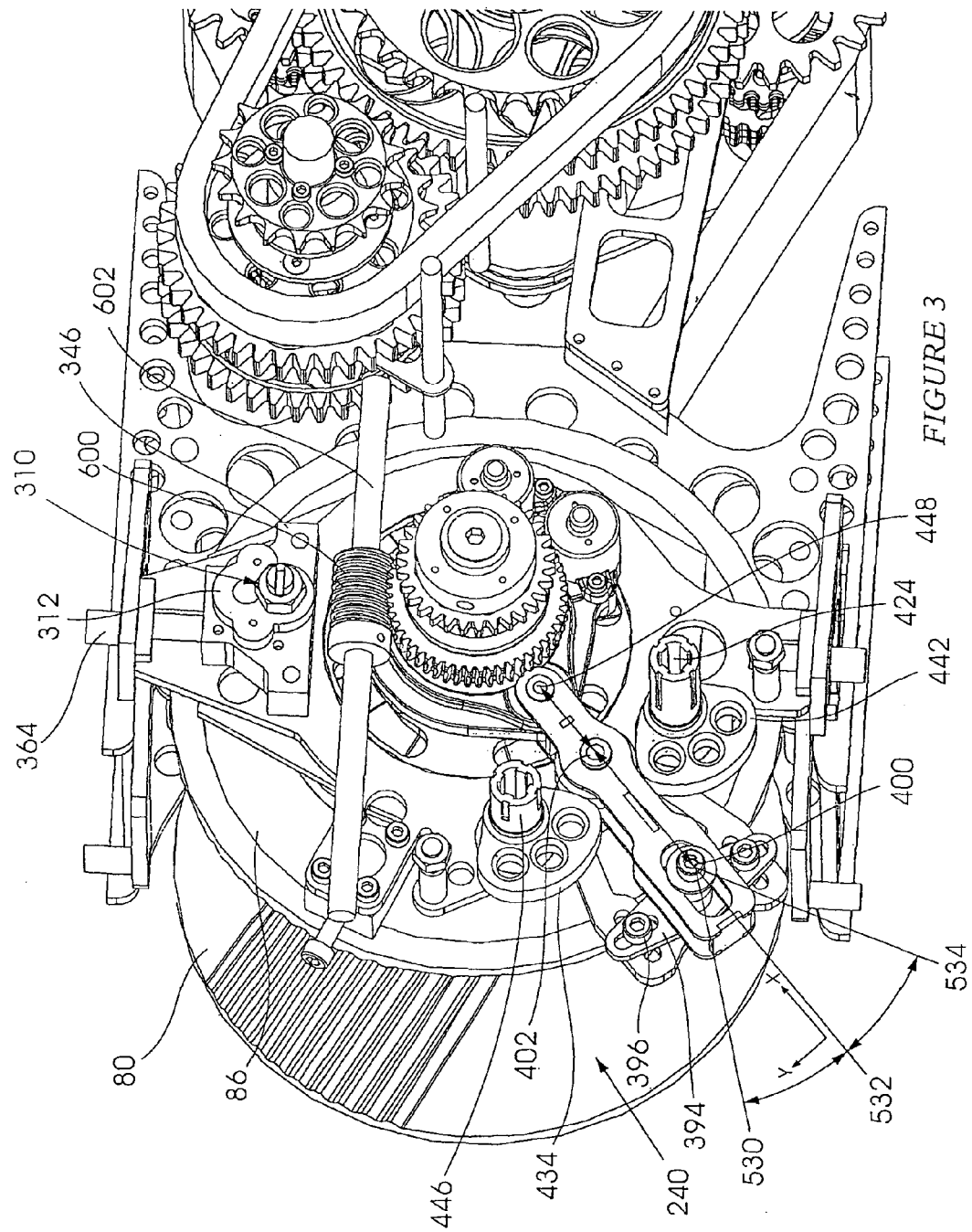
FIG. 3 is a side view of part of the machine with certain components omitted in order to clarify the nature of underlying components.

FIG. 3 shows the actuating lever 252 in a central or reference position. A line 530 shows the extent to which a central axis 532, also referred to as a reference position, of the lever is deflected to a maximum angular extent in a clockwise direction about the stud 400 and a line 534 shows the central axis of the lever deflected to a maximum, equal, angular extent in an anticlockwise direction about the stud.

Due to the 2:1 ratio of the drive of the cam arrangement via the gears 22 and 24 two revolutions of the discs 80 and 86 result in one complete oscillation of the cam arrangement. If no ratio changing takes place the lever 252 continues to oscillate as shown in FIG. 3 and the locking plate 246 oscillates in a counter direction to the lever. The tapered stud 320 of the locking unit 310 is acted on, in one direction, by the cam follower 316 which rides on the up ramp 126A of the cam lobe 126, carried by the inner disc 86. This action causes the tapered end 324 of the stud 320 to engage with the tapered lock hole 174, of the body 160, which is in register with the stud. The springs 350 and 352, which are compressed when the cam follower 316 is on the up ramp, expand to cause the stud to disengage from the lock hole 174, when the cam follower is on the down ramp 126B. During this period the ball screw unit 150 is held in position by the spring-loaded ball bearing 362 (FIG. 12) which is engaged with a respective hemi-spherical indentation 164 and the plungers 272 of the solenoids are retracted and held in the positions shown in FIG. 13.

The tapered end 324 of the stud 320 repeatedly engages with, and disengages from, the respective tapered lock holes 174. In this way the ball screw unit 150 is accurately aligned with the ball screw arrangement 136 at periodic intervals—this is required particularly after ratio shifting has taken place. The position of the stud 324 is reflected by the curve 580 in FIG. 24.

Ratio changing is preferably effected by means of an appropriate electronic control unit. The manner in which the control unit operates is apparent to one skilled in the art and is not described herein. What is required from the control unit is the ability to direct a signal to a selected solenoid at a precisely controlled interval which is related to the operation of the machine, in response to various input signals.

Figure 24:
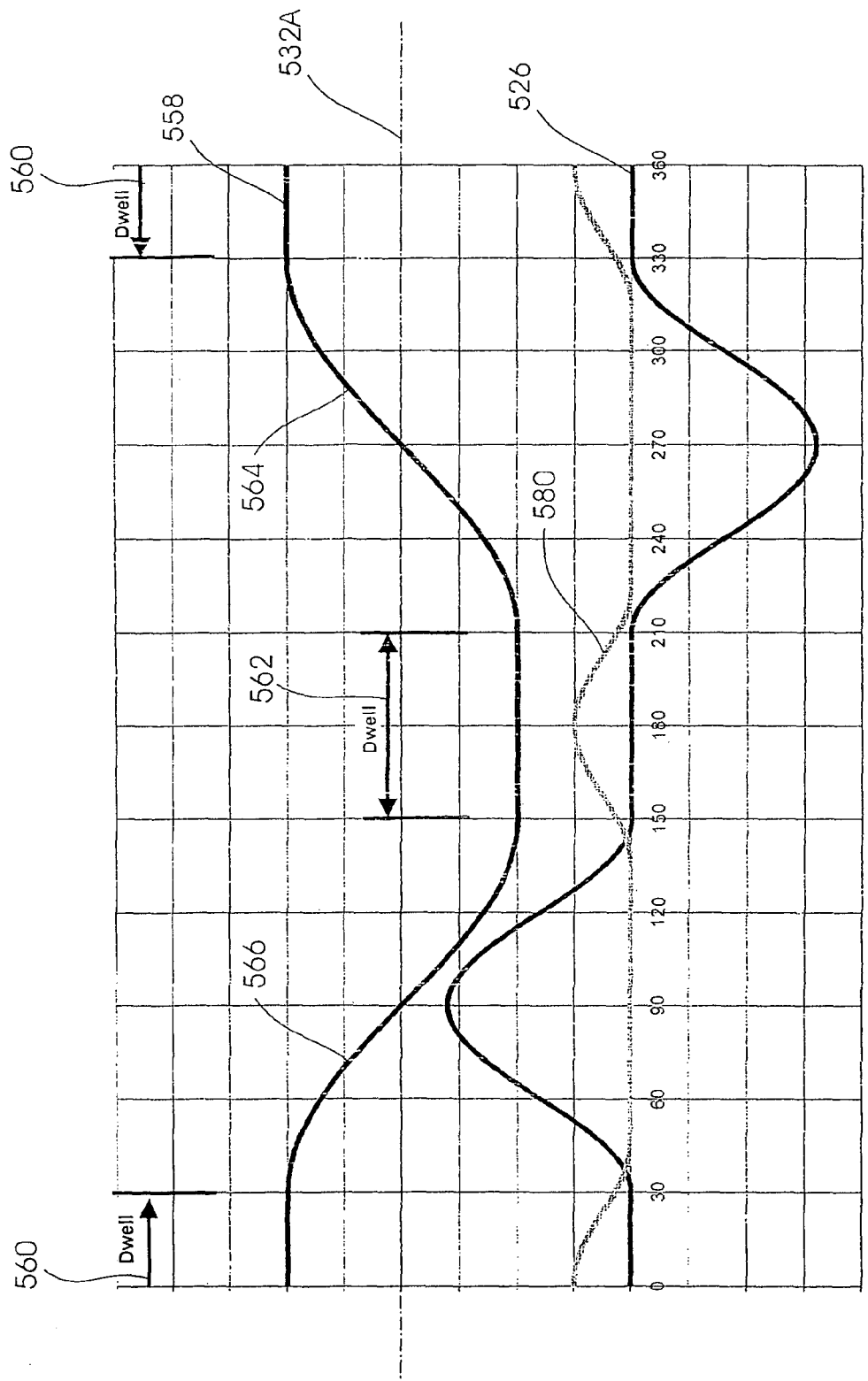

When the drive ratio is to be altered, the electronic control unit determines in which direction the ball screw unit 150 is to be rotated. Operation in one direction increases the ratio, while operation in the reverse direction decreases the ratio, in each case by a small increment. The electronic control unit then determines which solenoid 268 or 270 is to be operated. A curve 558 in FIG. 24 shows movement of the cam follower 446, on each side of a reference line 532A which represents the reference axis 532 as the lever 252 oscillates. The cam profiles 422 and 434 produce respective dwell periods 560 and 562, for rotational periods of 60° of the cams, at the end of each cam lift (564) and cam drop (566) phase. Each phase extends through 120°. During each dwell period the oscillating locking plate 246 is stationary. At the start of the appropriate dwell period power to the selected solenoid 268, 270 is interrupted and the plunger 272 of that solenoid is immediately moved under the action of its biasing spring 294 to stand proud of the surface 304. The solenoid selection is based on the rotation direction of the oscillating locking plate after its current dwell duration. The emerging plunger 272 is directed into engagement with the corresponding arcuate slot 182 in the body 160. At the end of the dwell period the oscillating locking plate starts moving in the reverse direction and, as the plunger is engaged with the deep hole end of the arcuate recess, the body 160 is thereby rotated together with the locking plate through 45°. In the process the ball screw unit 150 is also driven through 45° and, depending on the direction of rotation of the unit 150, the inner disc 86 is moved towards or away from the outer disc 80 by a small predetermined amount. This results in an incremental change of the output speed of rotation compared to the input speed of rotation.

At the end of the 45° movement the oscillating locking plate reaches its next dwell period. At this point the ball screw unit 150 is locked in position by the tapered stud 320 of the locking unit 310 which engages with the corresponding lock hole 174, in the body 160, which is in register with the stud. The solenoid which had been deactivated is then re-energised by the control unit. Upon reverse rotation of the oscillating locking plate the plunger of this solenoid rides up the ramp surface 188A or 188B in the respective arcuate slot and is then held in the retracted position, inside the housing 290, by the energised solenoid coil 292. Any tendency of the body 160 to move, due for example to frictional effects, is prevented by the engagement of the spring-loaded ball bearing 362 with a respective indentation 164 in the rim of the body. This retention action is however readily overcome by the positive drive action of the respective solenoid plunger when engaged with the deep hole end of the corresponding arcuate slot 182.

An incremental change in the drive ratio can thus be effected, up or down, for every two rotations of the discs 80 and 86.

In this example the actuating mechanism includes two actuators (solenoids) to increase the output speed incrementally, and to decrease the output speed incrementally. A single solenoid can however be used to replace the two solenoids provided the coil of the single solenoid is sufficiently powerful to retract the solenoid plunger against the bias of a spring (equivalent to the spring 294) and against all frictional forces, at a speed which meets operational requirements. To do this the four arcuate slots 182 on the raised circular portion 180 of the unit 150 are replaced by respective blind holes which are concentric with, and substantially of the same diameter as, the deep ends 190 of the slots. The single solenoid is then operated directly in place of the two solenoids to cause rotation of the unit 150 in one direction, or the other, through a predetermined angle.

FIG. 3 illustrates X and Y axes which are centred on the axis of the swivel stud 400 but which are shown displaced from this axis. The dimensions C and D marked in FIG. 19 are shown in FIG. 3. The central axis of the stud 400 can be adjusted in the X-direction, or in the Y-direction, within reason, according to requirement, by moving the plate 394 in one way or the other after the fasteners 396 have been loosened. The degree of movement, possible in this way, is limited by the dimensions of the slots 388 and 398. If the amplitude of movement of the pin 448 (measured with respect to its longitudinal axis) is P, and if the amplitude of oscillation of the longitudinal axis of the cam follower 446 is Q, then $$P = Q \cdot \frac{C+D}{D}.$$

If the position of the stud 400 is adjusted in the positive X direction by an amount x then $$P = Q \frac{C+D-x}{D-x}.$$

Thus as x increases, P increases. In practice this adjustment can be used to fine-tune the system and to ensure that the oscillating locking plate 246 oscillates through exactly 45° around the output shaft 92. The angular direction of the plate in each direction, from a neutral or reference line, is 22.5°.

A further factor is that by adjusting the stud 400 in the Y direction a phase shift of oscillation of the oscillating locking plate 246 is achieved. This adjustment can be used to ensure that the solenoid units are precisely in register with the respective deep hole ends of the recessed slots 182 during the cam dwell periods 560 and 562 shown in FIG. 24.

Ends of the chain 240 must be positioned to engage accurately with the grooves in the discs. This alignment can be affected by wear, temperature and by torque applied to or generated in the machine.

Further adjustment, which can take account of these factors, to ensure synchronisation of the machine, is possible by means of a worm gear 600 which is mounted to a shaft 602 which is rotatably supported by the housing 12. The worm gear 600 is engaged with the worm gear wheel 144—FIG. 3. The shaft 602 could be rotated by an electrical motor, not shown, in small increments, preferably under the control of the electronic control unit referred to, to ensure precise adjustment of the operation of the machine on an ongoing basis. Rotation of the shaft 602 causes rotation of the ball screw arrangement 136, relative to the unit 150, and causes movement of the disc 86 relative to the disc 80. The adjustment of the worm gear could be done in response to an algorithm established after calibration routines. Alternatively it could be done by a processor which operates in a real time, feedback mode to ensure precise synchronisation.

When the disc 86 is moved away from the disc 80, the stud 364 is moved in the same direction. The lever 366, restrained by the sliding movement of the stud 368 in a slot in the housing 12, also moves in a straight line 604—see FIG. 1A. The lever 500 which is mounted to the housing for rotation about the hole 506, is rotated by the relative sliding/rotating movement of the block 504 and the limb 508, which extends through the slot 216, then acts positively on the cam surface 212 and the composite slide assembly 239, and hence the idlers 234 and 236, are urged towards the discs thereby to maintain tension in the chain 240 and keep the loop 241 (FIG. 23) as close to circular as possible. When the disc 86 is moved towards the disc 80, the limb 508 which, due to the springs 606, at all times remains in contact with the surface 212, is allowed to rotate in a controlled movement in a direction which is away from the cam surface 212. The composite slide assembly can then move towards the chain drives 40 and 40A. The idlers 234 and 236 draw opposing portions of the chain between them and cause the swing arms 46, 48 to pivot closer towards each other due to the biasing forces of the springs 606—see FIG. 22. Again the chain tension is maintained.

Figure 20:
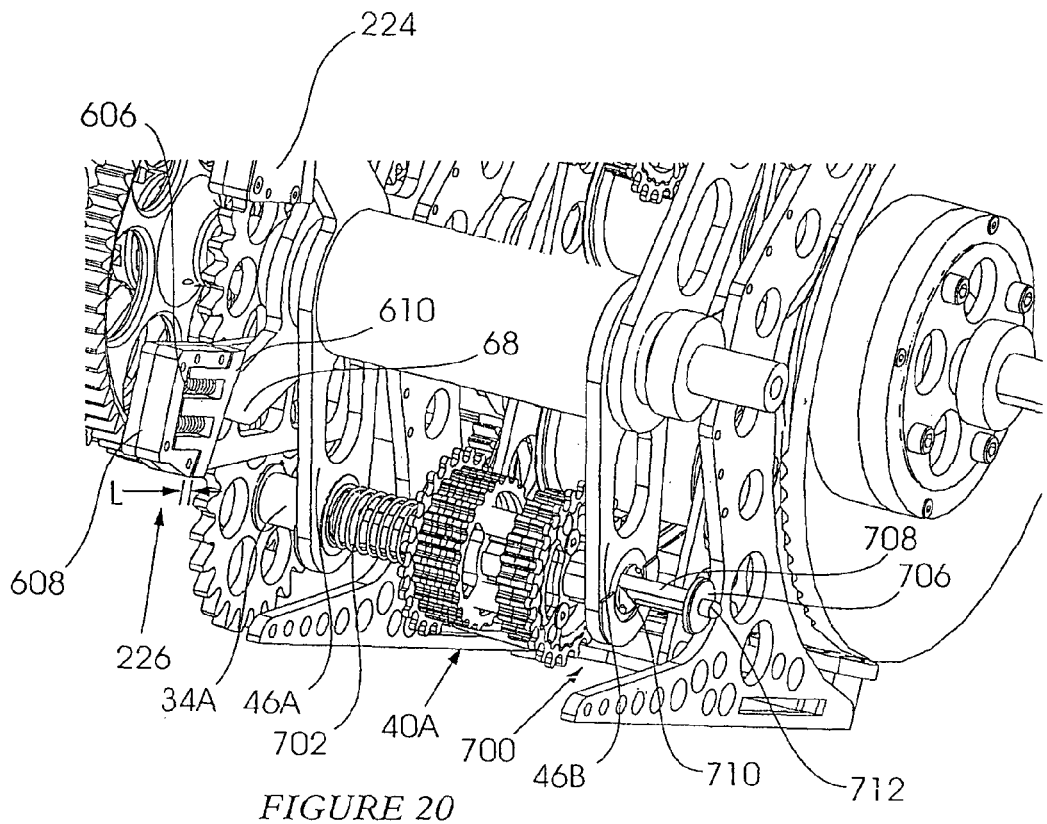
FIGS. 20 and 21 are perspective views from different angles from a drive input end of the machine, showing a chain positioning system.

The stops 224, 226 have the construction shown in FIG. 20 in that each stop includes springs 606, inside a housing 608, which bias a support plate 610 outwardly. The cam lobes 56 and 68 of the swing arms, described in connection with FIG. 4, bear against the respective support plates 610. FIG. 20 shows only the lower lobe 68. In a neutral position the spacing between each support plate and its housing is a distance L. The small degree of relative movement which is permitted and controlled by this arrangement is important for one of the swing arms (46 or 48) experiences a larger force than the other swing arm (48 or 46 as the case may be) when the machine is outputting power, or when the machine is absorbing power, for example due to engine braking.

Referring for example to FIG. 23 if the chain is moving in the direction of an arrow 650 and power is transmitted from the input drive to the output drive (e.g. for a vehicle going uphill) then an upper chain portion 652 is subjected to high tension while a lower chain portion 654 undergoes a reduced tension as the chain drive 40 acts as the input driver. A converse situation would result if power is transmitted from the output drive to the input drive for the chain drive 40A would act as the input driver (e.g. for the vehicle going downhill). In each instance a substantial amount, if not all, of the resulting slack in the chain, not taken up by the adjusting action of the composite slide assembly, is absorbed by the spring-loaded stops. The high tension portion (say 652) exerts force on the corresponding cam lever which causes the gap L on the corresponding stop to be reduced to zero. On the other hand the gap on the other stop is doubled to 2L. This causes a preload tension in the chain section which otherwise would have a much reduced chain tension. The benefit of this feature is that the part of the chain 240, between the chain drives 40 and 40A, which passes over the idler 50, is only subjected to the preload tension in the chain, and not to the load tension in the chain.

The chain 240 tends to push the discs 80 and 86 apart. The disc 80 is however not axially movable. The swing arms act as stops which, via the respective levers, exert a force on the ball screw arrangement (on the outer side of the disc 86) which tends to push the disc 86 towards the disc 80, to counteract the effect of the chain.

Figure 21:
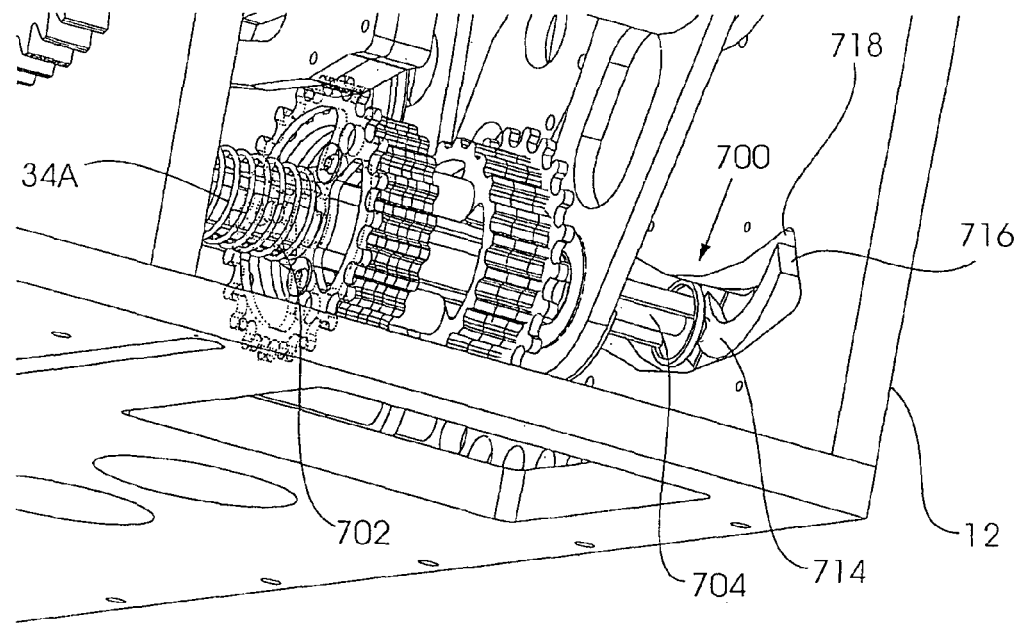

When the ratio of the machine is adjusted it is necessary for the chain drives 40 and 40A to be moved axially along the respective splined drive shafts 34 and 34A. FIGS. 20 and 21 illustrate a chain positioning system 700, which acts on the chain drive 40A, and which assists in achieving this function.

The upper chain drive 40 has a similar system. The system includes a compression spring 702 on the drive shaft 34A which acts between the arm 46A and the sprocket 42A. A pin 704 which is slidably located in a passage formed in the shaft 34A at one end, has a circular disc 706 which bears against the ends of push-plates 708 which are slidably located in corresponding grooves 710 of spline formations in the shaft. The pin has a hemi-spherical end 712 which bears against a sloped rib 714 of a chain position guide 716 mounted in a semicircular slot 718 in the housing 12.

When ratio changing takes place the end of the pin rides over the sloped rib 714 in one direction or the other according to the movement of the swing arms 46 and 48. If the arms are moved away from each other, as depicted in FIG. 23, the pin is urged to the left (referring to FIG. 21) by the sloped rib 714 and the sprockets 42A and 44A are moved to the left as the spring 702 is compressed. If the arms 46, 48 are moved in the opposing direction (towards each other as shown in FIG. 22) the pin can move to the right and thus exerts less pressure on the spring which then moves the sprockets 42A, 44A to the right. In this way positive displacement of the sprockets occurs according to requirement.

It is possible to increase the range of ratio adjustment by using a method similar to that described in the specification of application No. WO 2007030840 (the "second specification"). This is based on the principle of transmitting power in different directions through a variable part of the transmission in a low range and in a high range, generally as described in the second specification.

Figure 1B:
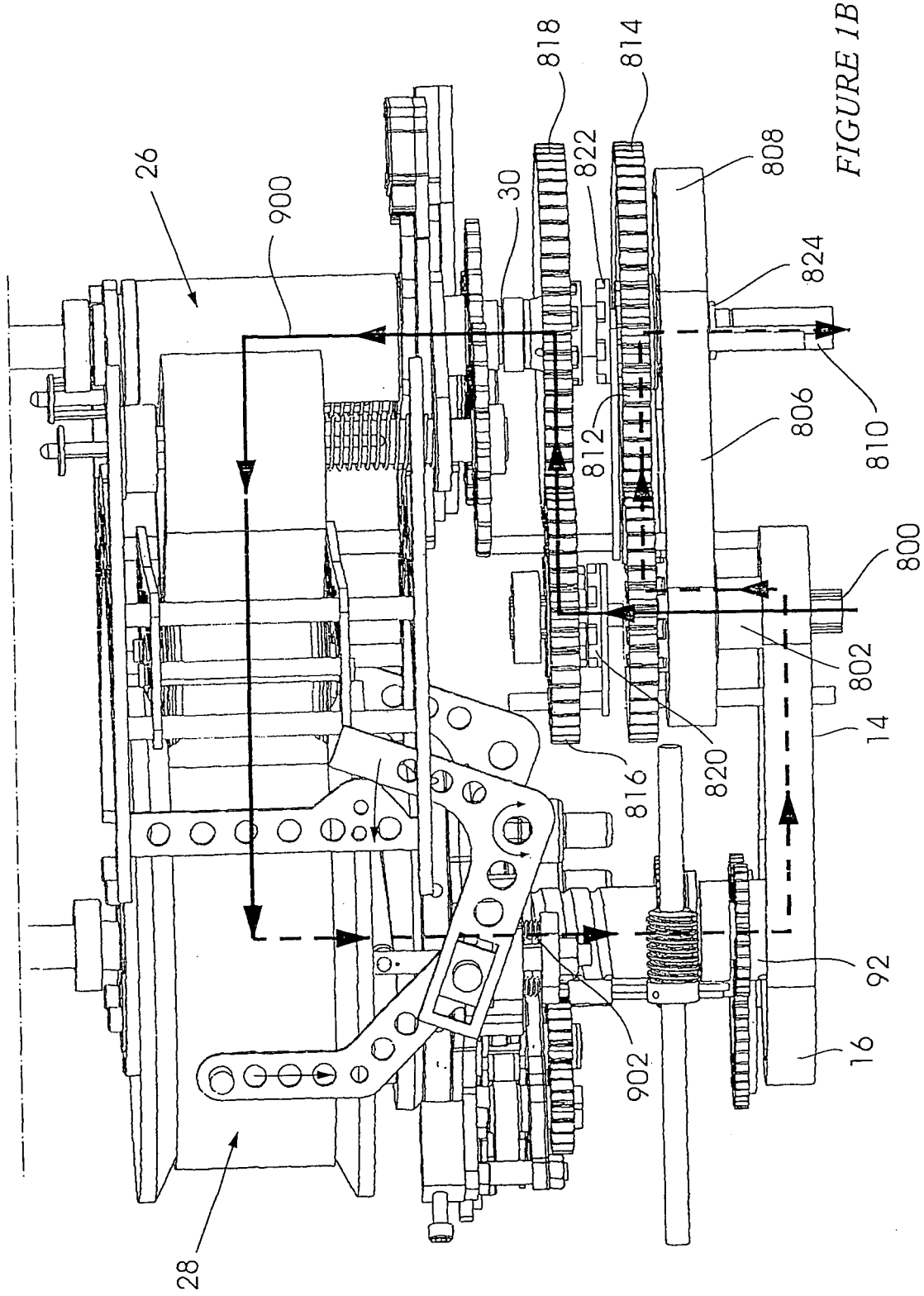

FIGS. 1A and 1B depict an input transmission shaft 800 on which is located a freely rotatable hub 802 which includes the chain drive 14 to the output drive shaft 92, a chain drive 806 to a freely rotatable sprocket 808 on a transmission output 810, and a gear drive 812 to a freely rotatable gear 814 located on the transmission output 810. A freely rotatable gear 816 is located on the transmission input shaft 800 and is meshed with a gear 818 which is fixed to the input shaft 30.

A dog clutch 820 is used to couple the input shaft 800 to the gear 816 or to couple the shaft 800 to the hub 802, according to requirement.

A second dog clutch 822 is used, as required, to couple the transmission output 810 to the gear 814, or to couple the output 810 to the gear 818 while having a central neutral position.

A third dog clutch 824 couples the transmission output 810 to the sprocket 808 or decouples these components, as the case may be.

In FIG. 1A and in FIG. 1B a solid arrow line 900 indicates power input to the transmission and a broken arrow line 902 indicates power output from the transmission.

In low range operation (see FIG. 1B) the dog clutch 820 couples the transmission input shaft 800 to the gear 816 and the dog clutch 822 couples the transmission output shaft 810 to the gear 814. Power thus flows from the transmission input shaft 800 to the gear 816, then to the gear 818 and into the machine input end. Power then flows out of the machine to the chain drive 14 to the gear drive 812, to the gear 814 and then to the transmission output shaft 810. Reverse is accomplished by decoupling the dog clutch 822 while using the dog clutch 824 to couple the sprocket 808 to the transmission output shaft 810.

In high range operation (see FIG. 1A) the dog clutch 820 couples the transmission input shaft 800 to the hub 802. The dog clutch 822 couples the transmission output shaft 810 to the gear 818. Power thus flows from the transmission input shaft 800 to the hub 802, through the chain drive 14 and into the machine. Power flows out of the machine to the gear 818 and to the transmission output shaft 810.

During dog clutch shifting from the low range to the high range all components across the respective dog clutches 820 and 822 rotate at the same speed. The overall transmission ratio remains constant (as described in the second specification) and instantaneous shifting can thus be accomplished without any clutch or torque converter action while no ratio change takes place in the machine.

The invention claimed is:

1. A variable transmission machine, comprising:
an input drive which is rotatable at a first speed about an input axis, the input drive including an input shaft which is rotatable about the input axis;
an idler which is rotatably mounted to the input shaft;
a first swing arm which is mounted for limited pivotal movement about the input axis;
a first drive sprocket on the first swing arm, a second swing arm which is mounted for limited pivotal movement about the input axis;
a second drive sprocket on the second swing arm, the drive chain being engaged with the first and second drive sprockets and passing over the idler;
an output drive which is rotatable at a second speed, which is dependent on the first speed, about an output axis;
a gear assembly which, upon rotation of the input shaft causes rotation of the first and second drive sprockets, thereby to cause rotation of the output drive;
a drive chain which transfers rotational drive from the input drive to the output drive;
a controller which is operable to vary the second speed;
a cam arrangement which, in response to rotation of the output drive, is oscillated between first and second positions through a reference position; and
an actuating mechanism which is selectively operable when the cam arrangement is at the first position to cause operation of the controller so as to increase the second speed by an increment, and which is selectively operable when the cam arrangement is at the second position to cause operation of the controller so as to decrease the second speed by an increment.

2. The machine according to claim 1, wherein the actuating mechanism includes a first actuator and a second actuator, and wherein each actuator is selectively operable when the cam arrangement is at the first position to cause operation of the controller so as to increase the second speed by an increment.

3. The machine according to claim 2, wherein each actuator is selectively operable when the cam arrangement is at the second position to cause operation of the controller so as to decrease the second speed by an increment.

4. The machine according to claim 3, which includes a body which is mounted for rotation about the output axis and which includes at least one formation which, upon selective operation of the actuating mechanism, is engaged with the actuating mechanism which is then constrained to rotate to a defined angular extent together with the body about the output axis in a first direction.

5. The machine according to claim 4, wherein the formation includes an arcuate slot, with a radius which is centered on the output axis, and with a ramped base which varies in depth.

6. The machine according to claim 2, which includes a body which is mounted for rotation about the output axis and which includes at least one formation which, upon selective operation of the actuating mechanism, is engaged with the actuating mechanism which is then constrained to rotate to a defined angular extent together with the body about the output axis in a first direction.

7. The machine according to claim 6, wherein the formation includes an arcuate slot, with a radius which is centered on the output axis, and with a ramped base which varies in depth.

8. The machine according to claim 2, wherein the first actuator includes a first solenoid and the second actuator includes a second solenoid.

9. The machine according to claim 1, wherein the first position is a first limiting position which is displaced by a first angle in a first direction of rotation from the reference position and the second position is a second limiting position which is displaced by the first angle in a second direction of rotation, which is opposite to the first direction, from the reference position and wherein the actuating mechanism is operable during a first dwell period when the cam arrangement is at the first limiting position, and actuating mechanism is operable during a second dwell period when the second cam arrangement is at the second limiting position.

10. The machine according to claim 1, wherein the output drive includes axially aligned, opposing, first and second conical discs which are spaced apart and which are rotatable about the output axis, and the controller includes a screw assembly which acts between the first and second discs and which is operable in a first mode, upon operation of the actuating mechanism, to increase the spacing between the discs by a first amount and so increase the second speed by an increment, and which is operable in a second mode, upon operation of the actuating mechanism, to decrease the spacing between the discs by a second amount and so decrease the second speed by an increment.

11. The machine according to claim 1, which includes a first stop which restricts pivotal movement of the first swing arm when a first portion of the drive chain between the first sprocket and the output drive is tensioned, a second stop which restricts pivotal movement of the second swing arm when a second portion of the drive chain between the second sprocket and the output drive is tensioned, the first stop including a first biasing mechanism which acts to tension the first portion of the drive chain when the second portion of the drive chain is tensioned, and the second stop including a second biasing mechanism which acts to tension the second portion of the drive chain when the first portion of the drive chain is tensioned.

12. The machine according to claim 11, which includes a support slide structure which is movable laterally relative to the output axis, and first and second guide idlers which are mounted to the support slide structure, which are engaged with the drive chain and which are spaced apart to form a gap through which opposing portions of the drive chain pass to, and from, the output drive respectively and wherein, in response to incremental movement of the cam arrangement, the support slide structure and the first and second guide idlers move and cause incremental pivotal movement of the first and second swing arms.

13. The machine according to claim 12, wherein the first stop is movable, in response to movement of the first swing arm and the action of the first biasing mechanism from a first stop position through a first gap with a maximum width of 2L, and the second stop is movable, in response to movement of the second swing arm and the action of the second biasing mechanism from a second stop position through a second gap with a maximum width of 2L and wherein the sum of the first gap and the sum of the second gap is 2L.

14. The machine according to claim 13, wherein the drive chain has a preload tension determined by the first and second biasing mechanisms.

15. The machine according to claim 1, wherein each drive sprocket is slidably mounted on a respective shaft and which includes a respective biasing device which biases the drive sprocket in a first direction along the shaft, and a cam mechanism which acts on and which moves the chain sprocket, against the biasing device, to a degree which is varied as the swing arm which carries the drive sprocket is pivoted.

16. The machine according to claim 1, which includes an adjustment mechanism, responsive to an increment in the second speed, to adjust the tension in the drive chain by adjusting the positions of the swing arms.

17. The machine according to claim 1, wherein, when power is output by the output drive, a portion of the drive chain between the first drive sprocket and the output drive is tensioned, and when power is input to the output drive, a portion of the drive chain between the second drive sprocket and the output drive is tensioned, thereby to reduce tension in the drive chain between the idler and each drive sprocket.

18. A variable transmission machine, comprising:
guide idlers which are spaced apart by a gap;
an input drive which is rotatable at a first speed about an input axis;
an output drive which is rotatable at a second speed about an output axis, the output drive including axially aligned opposing spaced apart first and second conical discs, the first disc including a first plurality of grooves, the second disc including a second plurality of grooves which oppose the first plurality of grooves, the discs being rotatable about the output axis whereby the first and second plurality of grooves are rotated through a position at which they are not clear of the gap;
a drive chain which passes in a loop around and between the discs and through the gap, between the guide idlers, and which includes formations which are engaged with the grooves thereby to transfer rotational drive from the input drive to the output drive;
a controller which is operable to vary the second speed;
a cam arrangement which is continuously driven by the output drive and which is synchronised to the output drive and which, in response to rotation of the output drive, is oscillated between first and second positions through a reference position; and
an actuating mechanism which is selectively operable when the cam arrangement is at the first position to cause operation of the controller to increase a spacing between the discs by a fixed incremental amount and so increase the second speed by an increment and which is selectively operable when the cam arrangement is at the second position to cause operation of the controller to decrease the spacing between the discs by a fixed incremental amount and so decrease the second speed by an increment, and wherein the spacing between the discs is increased, or decreased, only when the first and second plurality of grooves are clear of the gap.

19. The machine according to claim 18, wherein the actuating mechanism includes a first actuator and a second actuator, and wherein each actuator is selectively operable when the cam arrangement is at the first position to cause operation of the controller so as to increase the second speed by an increment.

20. The machine according to claim 19, wherein each actuator is selectively operable when the cam arrangement is at the second position to cause operation of the controller so as to decrease the second speed by an increment.

* * * * *